United States Patent
Riggs

(10) Patent No.: US 9,646,075 B2
(45) Date of Patent: *May 9, 2017

(54) SEGMENTATION AND STRATIFICATION OF DATA ENTITIES IN A DATABASE SYSTEM

(71) Applicant: Locus LP, Hamilton (BM)

(72) Inventor: Rory Riggs, New York, NY (US)

(73) Assignee: Locus LP, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 15/006,108

(22) Filed: Jan. 25, 2016

(65) Prior Publication Data

US 2016/0140211 A1    May 19, 2016

Related U.S. Application Data

(60) Continuation of application No. 14/801,775, filed on Jul. 16, 2015, now Pat. No. 9,245,299, which is a continuation-in-part of application No. 14/604,197, filed on Jan. 23, 2015, now Pat. No. 9,098,878, and a continuation-in-part of application No. 14/216,936, filed on Mar. 17, 2014, now Pat. No. 8,990,268, said application No. 14/801,775 is a continuation-in-part of application No. 14/604,272, filed on Jan. 23, 2015, now Pat. No. 9,098,564, which is a division of application No. 14/216,936, filed on Mar. 17, 2014, now Pat. No. 8,990,268.

(60) Provisional application No. 61/930,807, filed on Jan. 23, 2014, provisional application No. 61/801,959, (Continued)

(51) Int. Cl.
*G06F 17/30* (2006.01)
*G06Q 40/06* (2012.01)

(52) U.S. Cl.
CPC .... *G06F 17/30598* (2013.01); *G06F 17/3053* (2013.01); *G06F 17/30289* (2013.01); *G06F 17/30312* (2013.01); *G06F 17/30601* (2013.01); *G06Q 40/06* (2013.01)

(58) Field of Classification Search
CPC .......... G06F 17/30598; G06F 17/3053; G06F 17/30312; G06F 17/30601; G06F 17/30289; G06Q 40/06
See application file for complete search history.

(56) References Cited

U.S. PATENT DOCUMENTS

| | | |
|---|---|---|
| 6,868,525 B1 | 3/2005 | Szabo |
| 6,910,044 B2 | 6/2005 | Weinberg et al. |
| 7,003,522 B1 | 2/2006 | Reynar et al. |

(Continued)

FOREIGN PATENT DOCUMENTS

WO    02/052443 A1    7/2002

OTHER PUBLICATIONS

International Search Report and Written Opinion in PCT Application PCT/US15/12762.

(Continued)

*Primary Examiner* — Jorge A Casanova

(57) ABSTRACT

A stratified or segmented composite data structure can be formed by selecting a group of data entities, stratifying or segmenting them according to attributes, and assigning relative weights to the components based on their stratified or segmented positions. The attributes are selected from a universe of possible values. Further positive and negative biases can be applied at any arbitrary point or position, including to individual data entities, groups of arbitrarily selected data entities, or arbitrary positions.

15 Claims, 11 Drawing Sheets

Related U.S. Application Data filed on Mar. 15, 2013, provisional application No. 61/802,245, filed on Mar. 15, 2013.

(56) References Cited

U.S. PATENT DOCUMENTS

| | | |
|---|---|---|
| 7,117,175 B2 | 10/2006 | Arnott |
| 7,587,352 B2 | 9/2009 | Arnott |
| 7,620,577 B2 | 11/2009 | Arnott et al. |
| 7,685,069 B1 | 3/2010 | Subramanian et al. |
| 7,685,083 B2 | 3/2010 | Fairweather |
| 7,747,502 B2 | 6/2010 | Arnott et al. |
| 7,769,653 B2 | 8/2010 | Rousseau et al. |
| 7,769,663 B1 | 8/2010 | Subramanian et al. |
| 7,778,905 B2 | 8/2010 | Arnott |
| 7,792,719 B2 | 9/2010 | Arnott |
| 7,839,849 B1 | 11/2010 | Attig et al. |
| 7,870,052 B1 | 1/2011 | Goldberg et al. |
| 7,890,408 B2 | 2/2011 | Menchero et al. |
| 7,970,684 B1 | 6/2011 | Benda |
| 8,005,740 B2 | 8/2011 | Arnott et al. |
| 8,131,620 B1 | 3/2012 | Steinberg et al. |
| 8,156,154 B2 | 4/2012 | Taranov et al. |
| 8,306,892 B1 | 11/2012 | Gross et al. |
| 8,374,937 B2 | 2/2013 | Arnott et al. |
| 8,374,951 B2 | 2/2013 | Arnott et al. |
| RE44,098 E | 3/2013 | Arnott et al. |
| 8,412,609 B2 | 4/2013 | Lockwood et al. |
| 8,473,911 B1 | 6/2013 | Baxter |
| RE44,362 E | 7/2013 | Arnott et al. |
| 8,533,081 B2 | 9/2013 | Hsu et al. |
| 8,560,414 B2 | 10/2013 | Arnott |
| 8,645,317 B1 | 2/2014 | Klimetschek et al. |
| 8,694,402 B2 | 4/2014 | Arnott et al. |
| 8,805,735 B1 | 8/2014 | Goldberg et al. |
| 2002/0198885 A1 | 12/2002 | Streepy, Jr. |
| 2005/0166140 A1 | 7/2005 | Cai et al. |
| 2005/0171884 A1 | 8/2005 | Arnott |
| 2005/0197944 A1 | 9/2005 | Arnott |
| 2006/0149645 A1 | 7/2006 | Wood |
| 2007/0061266 A1 | 3/2007 | Moore et al. |
| 2007/0162412 A1 | 7/2007 | Percy |
| 2008/0301096 A1 | 12/2008 | Kogan et al. |
| 2010/0145748 A1 | 6/2010 | Mayle et al. |
| 2010/0169758 A1 | 7/2010 | Thomsen |
| 2010/0274733 A1 | 10/2010 | Engel et al. |
| 2012/0011118 A1 | 1/2012 | Gleicher et al. |
| 2012/0166358 A1 | 6/2012 | Steinberg et al. |
| 2012/0246094 A1 | 9/2012 | Hsu et al. |
| 2012/0317136 A1 | 12/2012 | Papish et al. |
| 2012/0327948 A1 | 12/2012 | Mohandoss et al. |
| 2013/0013608 A1 | 1/2013 | Bird et al. |
| 2013/0198108 A1 | 8/2013 | Walia et al. |
| 2014/0046872 A1 | 2/2014 | Arnott et al. |
| 2014/0280246 A1 | 9/2014 | Riggs et al. |

OTHER PUBLICATIONS

Aida Slavic, "Faceted Classification: Management and Use", Jan. 16, 2008.
Vanda Broughton, "A Faceted Classification as the Basis of a Faceted Terminology: Conversion of a Classified Structure to Thesaurus Format in the Bliss Bibliographic Classification, 2nd Edition", Axiomathes (2008), vol. 18, pp. 193-210.
International Search Report and Written Opinion in PCT Application PCT/US14/30825.
Fundamental Indexation, Robert D. Arnott, Jason Hsu, and Philip Moore, Financial Analysts Journal vol. 61, No. 2, 2005.
International Search Report and Written Opinion in PCT Application PCT/US14/30728.
Portfolio Selection, Harry Markowitz, The Journal of Finance, vol. 7, No. 1. (Mar. 1952), pp. 77-91.
A Simplified Model for Portfolio Analysis, William F. Sharpe, Management Science, vol. 9, No. 2 (Jan. 1963), pp. 277-293.
Measuring Predictability: Theory and Macroeconomic Applications, Francis X. Diebold, Lutz Kilian, Journal of Applied Econometrics, 16, 657-669 (2001).
Foundations of Portfolio Theory, Harry M. Markowitz, Nobel Lecture, Dec. 7, 1990.
A Five-Factor Asset Pricing Model, Eugene F. Fama and Kenneth R. French, Sep. 2014.
On Persistence in Mutual Fund Performance, Mark M. Carhart, Journal of Finance, vol. 52, Issue 1 (Mar. 1997), 57-82.
Federal Reserve Bank of New York Staff Reports, "Financial Intermediation, Asset Prices, and Macroeconomic Dynamics," Tobias Adrian, Emanuel Moench, Hyun Song Shin, Staff Report No. 422, Jan. 2010, Revised Sep. 2010.
Illiquidity Premia in Asset Returns: An Empirical Analysis of Hedge Funds, Mutual Funds, and U.S. Equity Portfolios, Amir Khandani, Andrew W. Lo, Jun. 25, 2009.
International Search Report and Written Opinion of EPO ISA dated Jun. 10, 2016, in PCT/US2016/014641 (WO 2016/118938), 11 pgs.
International Search Report and Written Opinion of USPTO ISA dated May 16, 2016 in PCT/US2016/014642 (WO 2016/118939), 14 pgs.
Extended European Search Report and European Search Opinion (EESR & ESO) dated Jun. 10, 2016, in EP 16152497.0, 8 pgs.
International Search Report and Written Opinion of USPTO ISA dated Jun. 10, 2015, in PCT/US2015/012762 (WO 2015/112906), 21 pgs.

1. Locus code: enterprise locus is \*.\*.\* A\*\* (real estate)
   A. Locus code: enterprise locus is 2.2.2 A\*\* (real estate developers)
      i. Locus code: customer locus is F \*.\*.\* \*\*\* (consumer real estate developers)
      ii. Locus code: customer locus is 2.2.2 \*\*\* (industrial real estate developers)
   B. Locus code: enterprise locus is 1.3.2 A\*\* (real estate operators)
      i. Geography: > 50% of properties (by square footage) in North America (North American real estate operators)
      ii. Geography: > 50% of properties (by square footage) in Europe (European real estate operators)
      iii. Geography: >50% of properties (by square footage) in Asia (Asian real estate operators)
   C. Locus code: enterprise locus is 3.3.2 A\*\* (REITs/real estate lessors)
      i. Company fundamentals: Debt/Equity ratio ≤ 2 (low-leverage REITs)
      ii. Company fundamentals: Debt/Equity ratio > 2 (leveraged REITs)

2. Locus code: enterprise locus is 2.2.2 (B1i OR B2i OR B2ii OR BDivDiv) (equipment materials manufacturers)
   A. Locus code: final resource locus is \*\*\* (2.2.2 or 1.2.2) C\*\* (manufacturers of materials for information-processing equipment)
      i. Company fundamentals: gross sales ≥ group 2A average (high-volume manufacturers of materials for information-processing equipment)
      ii. Company fundamentals: gross sales < group 2A average (low-volume manufacturers of materials for information-processing equipment)
   B. Locus code: final resource locus is not \*\*\* (2.2.2 or 1.2.2) C\*\* (manufacturers of materials for non-information-processing equipment)
      i. Company fundamentals: number of employees ≤ 50 (small manufacturers of materials for non-information-processing equipment)
      ii. Company fundamentals: number of employees > 50 and ≤ 100 (medium manufacturers of materials for non-information-processing equipment)
      iii. Company fundamentals: number of employees > 100 (large manufacturers of materials for non-information-processing equipment)

FIG. 3

```
<bar-code> ::===
    <ent-bar-code> "::"
    <int-bar-code> "::"
    <first-int-bar-code> "::"
    <second-int-bar-code> "::"
    <para-cust-bar-code> "::"
    <cust-bar-code> "::"
    <cust-wg-bar-code> "::"
    <cust-dept-bar-code> "::"
    <cust-final-bar-code> "::"
    <cust-sub-bar-code> "::"
    <c-of-c-bar-code> "::"
    <c-of-c-wg-bar-code> "::"
    <c-of-c-dept-bar-code> "::"
    <c-of-c-final-bar-code> "::"
    <c-of-c-sub-bar-code>
```

<ent-bar-code> ::== <ent-locus> <ent-process-marker> <ent-product-marker> <temp-coord-value>

<temp-coord-value> ::== "First" | "Second"
<ent-product-marker> ::== "Resource-Product" | "Activity-Product"
<ent-process-marker> ::== "In-house" | "Outsourced"

<ent-locus> ::=== <long-locus>
<int-locus> ::=== <long-locus>
<first-int-locus> ::== <long-locus>
<second-int-locus> ::== <long-locus>

<para-cust-locus> ::== <long-locus>
<cust-locus> ::== <long-locus>
<cust-wg-locus> ::== <long-locus>
<cust-dept-locus> ::== <long-locus>
<cust-final-locus> ::== <abbr-locus>
<cust-sub-locus> ::== <abbr-locus>

FIG. 8A

```
<c-of-c-locus> ::== <long-locus>
<c-of-c-wg-locus> ::== <long-locus>
<c-of-c-dept-locus> ::== <long-locus>
<c-of-c-final-locus> ::== <abbr-locus>
<c-of-c-sub-locus> ::== <abbr-locus>

<abbr-locus> ::== <subject-resource> <activity> <direct-object-resource>
<long-locus> ::== <subject-resource> <activity> <direct-object-
resource> <indirect-object-resource>

<activity> ::=== <verb>
<verb> ::== "Div" | <phase> "." <department> "." <division>

<subject-resource> ::=== "" | <noun>
<direct-object-resource> ::=== <noun>
<indirect-object-resource> ::=== "" | <noun>

<noun> ::== <resource><resource-stage><resource-stage-value> |
    <resource-human><resource-staging-human> |
    <resource-div> |
    <resource><resource-stage-div> |
    <resource><resource-stage><resource-stage-value-div>

<phase> ::== "1" | "2" | "3" | "4"
<department> ::== "1" | "2" | "3"
<division> ::== "1" | "2" | "3"
<resource> ::== "A" | "B" | "C" | "D"
<resource-stage> ::== "1" | "2" | "3" | "4"
<resource-stage-value> ::== "i" | "ii" | "iii"

<resource-human> ::== "F"
<resource-staging-human> ::== "Work" | "Non-Work" | "Both"

<resource-div> ::== "DivDivDiv"
<resource-stage-div> ::== "DivDiv"
<resource-stage-value-div> ::== "Div"
```

FIG. 8B

SEGMENTATION AND STRATIFICATION OF DATA ENTITIES IN A DATABASE SYSTEM

CROSS-REFERENCE TO RELATED APPLICATIONS

This application is a continuation of application Ser. No. 14/801,775, filed Jul. 16, 2015, which is a continuation-in-part of application Ser. No. 14/604,197, filed Jan. 23, 2015, now U.S. Pat. No. 9,098,878, which claims the benefit of U.S. Provisional Application No. 61/930,807, filed Jan. 23, 2014, and which is a continuation-in-part of application Ser. No. 14/216,936, filed Mar. 17, 2014, now U.S. Pat. No. 8,990,268, and which claims the benefit of U.S. Provisional Application Ser. No. 61/801,959, filed Mar. 15, 2013, and U.S. Provisional Application Ser. No. 61/802,245, filed Mar. 15, 2013, the contents of all of which are herein incorporated by reference in their entirety. Application Ser. No. 14/801,775, filed Jul. 16, 2015, is also a continuation-in-part of application Ser. No. 14/604,272, filed Jan. 23, 2015, now U.S. Pat. No. 9,098,564, which is a divisional of application Ser. No. 14/216,936, filed Mar. 17, 2014, now U.S. Pat. No. 8,990,268, which claims the benefit of U.S. Provisional Application Ser. No. 61/801,959, filed Mar. 15, 2013, and U.S. Provisional Application Ser. No. 61/802,245, filed Mar. 15, 2013, the contents of all of which are herein incorporated by reference in their entirety.

FIELD OF THE INVENTION

The present invention relates generally to computerized techniques using a logical data model for stratifying or segmenting data entities.

BACKGROUND OF THE INVENTION

The management of investment portfolios has been the subject of substantial theory and research. Portfolio theory considers how wealth should be invested and how to maximize a portfolio's expected return for a given amount of portfolio liquidity-adjusted risk, or, equivalently, minimize liquidity-adjusted risk for a given level of expected return, by carefully choosing the proportions of various assets. While a certain rate of return may be expected, the valuation of individual holdings in the portfolio can depart upward or downward from that expected rate of return. This upward and downward variation from the expected value is known as variance, or volatility. Over time, securities, in theory, should have an efficient frontier for expected volatility and return. According to theory, securities with a higher expected risk will have a higher expected return.

Financial indices are often used to benchmark the performance of a financial instrument. The S&P 500® Index is an example of one such benchmark for stock-oriented funds and the Barclays Aggregate Bond Index is an example of a benchmark for bond funds. The S&P 500® is the largest equity benchmark in the world. Trillions of dollars are either invested in this benchmark or in funds benchmarked to it. Since yearend 1999, U.S. broad market indices such as the S&P 500® have experienced long periods of underperformance. For example, an investor in the S&P 500® at yearend 1999 was down approximately 20% 10 years later in nominal terms at yearend 2009, depending on fees and treatment of dividends. It was not until late 2012 that the S&P 500® had a positive nominal return for these yearend 1999 investors, including many large pension funds and endowments. As of October 2014, the S&P 500® had a negative real return since yearend 1999. During this same period, broad-based funds holding U.S. government or corporate debt have had positive real returns with corporate debt earning more than government debt during this period. This premium was due to the extra risk of a corporate bond versus a U.S. government bond of comparable duration. These markets had their annual fluctuations, but have been fairly stable; over a reasonable period of time, these securities had both positive returns and differences that would be expected based on risk. Neither of these statements can be made for equity indices such as the S&P 500® that lost value on an absolute basis and underperformed materially over a long period of time with respect to the less risky indices holding investment-grade corporate or government debt.

Given a cap-weighted methodology, a change in the market value of a relatively large company has a disproportionate effect on an equity index, while a change in the debt outstanding of a relatively highly indebted issuer has a disproportionate effect on a fixed income index. Funds that track these indices also experience the corresponding fluctuations in value as the instruments representing the relatively larger companies fluctuate in value.

The S&P 500®, like most broad market indices, is capitalization-weighted. This means that the weight of an individual company in the index is proportional to its market capitalization relative to the other constituents. There are no controls in the S&P 500® to ensure that a single security or groups of securities that share a common risk do not become overweighted to represent too large a proportion of the portfolio. That is, the types of controls used in scientific fields and engineered processes where population controls are used to limit the influence that one part of a population can have on a total population being measured are not used in the broad market indices. Such controls limit both positive and negative influences. In population studies, controls are used to produce a normative model of an underlying population. Because there are no controls in the benchmarks currently used to invest in equity securities, there is no assurance that historical returns from yearend 1999 to the present are representative of equity securities in general. The strategy of capitalization-weighting without controls has produced below-average returns for long periods of time.

The results of the major U.S. broad-market equity indices since 1999 appear to be inconsistent with the main theories of the pricing of investment securities and the theory of efficient markets. Much of the work on efficient markets and asset pricing followed the pioneering work of Markowitz and Sharpe with later notable additions by others such as Fama and French. Their theories suggest that individual securities are priced at a level that is expected to produce a risk-adjusted return relative to other investment securities and that, by following certain rules, a portfolio of securities has a higher probability than an individual security of achieving this risk-adjusted rate of return in any given period or over several periods.

The principles that Markowitz and others proposed have been used to assist investors and managers in the selection of the most efficient portfolio design by analyzing various possible portfolios of a given set of securities. By delineating a portfolio construction process that entails choosing securities whose risk-return profiles diverge significantly, the models show investors how to reduce their risk. The foundational model in this area is known as the mean-variance model because it is based on expected returns (mean) and the distribution from expected returns (variance) of the various portfolios. When developing the original mean-variance model, Markowitz made the assumption that a portfolio that maximizes return for a given risk or minimizes risk for a given return is an efficient portfolio. Thus, portfolios are selected using the following rules: (a) from the portfolios that have the same expected return, the investor will prefer the portfolio with lower risk, and (b) from the portfolios that have the same risk level, an investor will prefer the portfolio with higher expected rate of return.

To facilitate portfolio construction, Markowitz used the expected covariance or correlation among securities as an additional input that would enable investors to maximize their risk-adjusted return at the portfolio level. Although an individual security may underperform for a long period of time, the rules developed for efficient portfolio construction were designed to reduce, through diversification, this probability of underperformance with respect to the portfolio of securities. According to these foundational theories, investors could expect to be compensated only for systematic, or broad-market, risks, with a premium commensurate with the risks of a given asset class, and should be able to diversify away their exposure to non-systematic risks at the efficient frontier, consisting of the hypothesized market portfolio.

One explanation for the inconsistency between modern portfolios and the theoretical portfolios on which the efficient market hypothesis was developed is that modern portfolios operate at a much greater scale and level of complexity than the theoretical examples. The early theoretical models based on the efficient market hypothesis and capital asset pricing model tend to use individual securities and describe diversification within portfolios consisting of numbers of securities that are in the single digits and low double digits. Many of the foundational papers were written before the mutual fund boom of the 1980s and 1990s following the creation of individual retirement accounts (IRAs) by the Employee Retirement Income Security Act (ERISA) of 1974, as well as the introduction of the first index fund in 1976. For example, the Markowitz paper on portfolio selection published in the Journal of Finance was written in 1952. According to the first shareowner census undertaken by the New York Stock Exchange (NYSE) in 1952, only 6.5 million Americans owned common stock at the time (about 4.2% of the U.S. population), and each held an average of four stocks. Sharpe's paper, "A Simplified Model for Portfolio Analysis," was written in 1963 and his book, "Portfolio Theory and Capital Markets," was written in 1970, long before the mutual fund boom created by ERISA, the advent of globalization and modern technology, the development of exchange-traded products enabling retail investors en masse to hold thousands of securities at once, or the widespread recognition by institutional investors of the unique problems associated with managing such large funds.

Modern portfolios manage trillions of dollars in the aggregate. The total investment into US mutual funds was $13 trillion dollars in 2012. In order to reduce exposure to non-systematic risks while avoiding relatively illiquid positions, the portfolios require thousands of securities in diverse risk groups. At this scale, lacking applicable financial theory to guide selections and weights, as portfolio theory was developed for portfolios of a much smaller scale, building efficient portfolios has been challenging. The absolute scale of investment today by very large institutions has grown exponentially since the mutual fund boom of 80s and 90s, discussed above. In addition, the underlying population of securities has grown in heterogeneity and complexity. This diversity and interconnectedness is increasing every year. The need to control for the non-systematic risks embedded in this portfolio of companies also increases every year.

There is a need for a framework that enables the systematic comparison and contextualization of all types of securities in today's complex heterogeneous global market. Specifically, there is a great need for a framework that enables systematic comparison and contextualization of all types of equities in today's complex heterogeneous global market. A systems approach to organizing economic and financial information would accomplish this by enabling us to interrelate the vast data related to these activities and analyze economic and financial interdependencies.

In addition, there is a need for a new normative methodology for constructing portfolios of investment securities, one that addresses the complexities of today's companies and the increasing size and diversity of today's funds by applying the approach and foundational principles of Markowitz and Sharpe to the complexities of today's large-scale funds.

Some efforts for portfolio construction attempt to address the complex heterogeneous global market by relying on existing systems for classifying companies. Current systems of classification, such as Global Industry Classification Standard (GICS), are not well-suited for building new models of potential efficient portfolios of these large-scale modern investment vehicles that draw upon complex and globally interrelated universes of equities. The NAICS or GICS relate companies by their positions in a fixed hierarchy. There are two significant limitations of the fixed NAICS and GICS hierarchies: 1) any items without a common parent are unrelated and cannot be compared using terms in the hierarchy; 2) any items sharing a parent can only be compared along the terms that GICS or NAICS uses to label that group (insofar as the names of the groups indicate the term that separates them, e.g., "consumer" versus "commercial" may relate to the customer base).

These systems, similar to the foundational papers in finance, were created before the advent of large digital databases; they are modeled after the frameworks of the time such as the Dewey Decimal System and Standard Industry Classification System. Those systems rely on a fixed hierarchy in which each entity has a single parent; that parent has a single parent, and so on. Each parent has descriptions, but not concepts of specific attributes that would enable an entity under one parent to be related to an entity under another parent.

Without the ability in the data structure to relate an entity under one parent to an entity under another parent, it is hard to understand the multivariate risks to which companies are exposed and, thus, to see how many securities in a large portfolio or index may share a similar or related risk. The shortcomings of current classification systems are becoming increasingly apparent given the complexities of today's companies and the increasing size and diversity of today's funds. Although many of the biggest risks in a capitalization-weighted strategy result from the lack of controls for single risk exposures, bubbles, or massive non-systematic price corrections, there are currently limited tools to systematically address these problems. Thus, there is a need for a multivariate attribute-driven categorization system enabled by current data processing capable of providing these tools as well as the ability to build multiple different portfolios to assess the efficiency of each and test for a normative case.

Benchmarks

In addition to the systems used to organize securities and the information about them, modern portfolio construction is challenged by another step of the process which has been slow to evolve: the benchmarks against which to compare their performance. In other areas of economics and finance, the role of benchmarks has been well established. Central banks routinely use inflation targets to guide policy, which has proved instrumental in increasing the predictability of price changes. This has enabled consumers, merchants, and investors to consume, save, and invest with a high degree of confidence in near to medium-term price changes. National economic ministries routinely project their future annualized GDP growth and seek to achieve it, which multilateral institutions, banks, and investors rely on as an index of a country's economic health.

In corporate finance, publicly traded companies regularly issue earnings guidance and have quarterly earnings targets, which it is the CFO's principal role to achieve. Companies are benchmarked against their earnings targets and held accountable for them by boards and financial analysts, and even minor shortfalls in earnings frequently lead to precipitous drops in stock price. CFOs are also expected to deliver on target returns on equity, which, since it is junior to debt in the capital structure, has a higher cost of capital for a given company and should have higher returns than the debt issued by a company. In each case, modern technology has enabled decision makers to more accurately forecast future economic and financial outcomes, control for risk, and achieve their benchmarks with a high degree of predictability.

At the portfolio level, however, there is no comparable accountability for equity benchmarks. Since equity investments are riskier than debt investments at the portfolio level all equity indices should strive to earn a consistent premium to corporate long-term bonds. Just as all companies will expect a higher cost of equity than debt financing, all equity investors' indices, like the companies they invest in, should anticipate a higher return when they invest in a company's equity rather than its debt issuances. Because of the statistical properties of large sets of securities, investors should expect to see this risk premium even more consistently in an index portfolio. This risk premium should be realized at the portfolio level; equity index investors should strive to beat corporate long-term bond returns for their constituent group on a consistent basis.

The capital asset pricing model uses the term alpha to describe outperformance of a benchmark; from a company's perspective, generating alpha entails beating its return projections. For any given company, an equity premium is commensurate with achieving earnings estimates and outperforming borrowing rates. The same principle should hold at the portfolio and index level; investors in portfolios of equities should expect returns that are higher than the average borrowing rate for the bonds of a given constituent group. If an index or portfolio does not achieve the performance target predicted by theory, a new methodology is required that will realize that target more consistently and predictably.

The S&P 500 is widely accepted as an equity benchmark even while it continues to lack risk controls and exhibit higher volatility than predicted by theoretical models. It fails to achieve the rates of return predicted for it by the foundational finance theories and asset pricing models. Nevertheless, the methodology of the S&P 500 has not changed significantly since its inception, and it has failed to capitalize on the tools of modern technology and data analytics to control for risk and achieve more predictable, reliable rates of return. Thus, there is a need for a reconsideration of how to construct equity benchmarks and the standards for them.

Conglomerates

Corporations have sought to achieve diversification at the company level through the conglomerate form, which involves acquiring and managing multiple independently operated and often functionally unrelated businesses through a parent company. Owners of conglomerates sought to reduce the volatility in earnings associated with business cycles in various industries by organizing relatively uncorrelated income streams under the same corporate structure; some also sought to achieve cost savings through synergies in procurement, branding, marketing, and sales, to avoid antitrust restrictions on expansion and consolidation in a particular industry by aggregating interests across multiple sectors.

Although conglomerates have enjoyed substantial popularity in certain wealthy countries following long periods of high economic growth—the U.S. in the 1960s, Japan in the 1980s, and more recently, South Korea—they have largely fallen out of favor in high-income markets. The extra layers of bureaucracy and lack of sufficient industry expertise at the holding or parent company level frequently have made conglomerates too complex to manage effectively.

More recently, private equity firms have sought to achieve similar objectives to those of conglomerate managers by acquiring and managing mature businesses, frequently in a wide variety of industries. The significant fees charged by such firms, typically comprising 2% of assets managed and 20% of returns over a benchmark in addition to deal-specific fees, have impeded their ability, as a group, to generate high returns to investors, while other firms have foundered due to similar challenges that confronted conglomerates, failed to capitalize on potential marketing, sales, and operational synergies, or incurred excessive leverage that contributed to large losses during economic downturns.

While some private equity firms consistently have shown very strong performance, most of them are limited partnerships inaccessible to the general public due to regulatory restrictions, and the information regarding their operations, strategy, and investments is largely opaque and frequently unavailable. The lack of transparency and liquidity in these funds, as well as the challenges involved in managing businesses across disparate sectors, have impeded the capacity of these firms to scale. At present, the largest traditional investment firm itself manages more capital than the entire global private equity industry combined.

Volatility

Volatility in pricing refers to fluctuations in price. Volatility is a significant factor in portfolio performance and these price fluctuations may create a drag on portfolio growth. For example, daily volatility has been shown to hurt the return of leveraged exchange-traded funds. Random movements in investment securities without controls at the portfolio level, especially large downward movements caused by unpredictable events or the popping of non-systematic bubbles, reduce risk and liquidity-adjusted returns. In these cases, there is little to no expectation that portfolios and their constituent investment securities will rebound to pre-existing levels. In both of these cases, the securities being impacted are being re-priced because of new information or a sudden market recognition that they were overpriced.

In an effort to reduce the effects of volatility on a portfolio, various weighting schemes have been proposed in the investment industry. For example, one method described in U.S. Pat. No. 8,306,892 operates by calculating weights based on market capitalization, gross-domestic product, and geographic region. In another example, described in U.S.

Pat. No. 8,131,620, weights in a portfolio of securities are based on market capitalization and dividend yield. Numerous other portfolio weighting schemes exist. However, none of these weighting schemes fully address the shortcomings of prior art portfolio theory, as discussed above. Some examples, such as that described in U.S. Pat. No. 8,005,740, use accounting-based metrics for weighting securities universes.

In prior art portfolio construction, random groups of securities are likely to have periods of significant valuation swings, both up and down, from one time period to another. These massive swings in value in random groups of securities may not be caused by variables such as accounting attributes or their designation as "growth" or "value" stocks. The valuation swings could be caused by, for instance, companies being long a specific commodity when the commodity suddenly loses its value; over-exuberance in the demand prospects for a company's or industry's product that does not meet demand; long fixed-cost contracts when the actual costs available to their competitors changes; over-weighting of a certain asset in the product mix when that asset loses its value; or other idiosyncratic reasons.

There are many reasons for apparently random bubbles. In some cases, they are systematic or broad-market bubbles; in others, they are largely limited to a constituent group (such as an asset class or industry). There are certain events that appeared to be systematic because they impacted index and portfolio returns so severely, such as the Internet bubble of the late 1990s, but are non-systematic. In either case, the impact on an investor's returns when the bubbles collapse can be extremely negative as a result of portfolio biases and overexposure to constituents that are especially impacted by the collapse of the bubble.

The random walk hypothesis in financial theory represents the inability to address the apparent randomness of volatility and returns in equity-based investment securities. The hypothesis implies that in an efficient market, a large random selection of equity-based investment securities will perform as well as an actively-managed selection of equity-based securities, before adjusting for taxes and fees. The random walk hypothesis is the underlying reason for the proliferation of index funds and the broad support for passive index funds by the academic community. The hypothesis, taken to its logical extreme, suggests that a blindfolded monkey throwing darts at the stock listings could select a portfolio that would do just as well as one selected by the experts.

Many different weighting strategies have been proposed to deal with this problem of random volatility in equity-based investment securities. The recent underperformance of these passive capitalization and even-weighted indices to debt indices that track comparable universes of companies has highlighted that these passive indices continually affirm the same randomness hypothesis.

A major problem in the risk management of large portfolios of securities is the inability in existing systems to control for the occurrence of these types of events without a framework to define homogeneous subpopulations. If a portfolio inadvertently over-weights in a security or groups of securities that have a common bubble or bankruptcy risk, the returns can be materially impacted by a relatively small number of securities in the portfolio. Non-systematic bubbles and bankruptcies are associated with non-systematic factors of the industries, companies, or assets associated with specific investment securities. In several cases, over-weighting in specific non-systematic variables has caused significant negative impacts on a portfolio. This was clearly the case of the Internet bubble. In calendar year 2000, the capitalization-weighted S&P 500® was down 9.09%. In that year, there were 16 stocks that were down 49.8%, while the rest of the market was up 4.28%. Unfortunately for investors in funds tracking that index, these 16 companies, which were all in the business of moving, storing, or processing information, comprised 24.8% of the total portfolio. The underperformance of these select securities had a massively disproportionate effect on the index, and the trillions of dollars in funds benchmarked to it, because of the lack of controls on the underlying index.

Prior efforts to improve portfolio returns generally appear to have at least three problems: 1) a sub-optimal number of groups; 2) insufficient ability to control for covariance within groups or correlation among groups to ensure that each group operates in a predictable group-specific way; and 3) no way of defining a group in a systematic way that is applicable across an entire economy and permits all groups to be related to one another. Existing large-scale heterogeneous indices and portfolios of securities lack controls on their constituent groups and neither capitalization-weighting nor even weighting are capable of reducing the impact of group-specific risks at the portfolio level in a population of securities.

Covariance and Correlation

While finance theorists have made significant breakthroughs in forecasting the return and variance for individual securities, there has been little advancement in finding reliable indicators of the pairwise correlations or covariances between securities, a required input to the Markowitz model. In 1973, financial economists Edwin Elton and Martin Gruber addressed why quantitative solutions are unlikely to be practicable at scale, and noted that to obtain efficient portfolios from among 200 stocks, 19,990 correlation coefficients would have to be produced.

There are also institutional impediments to finding generally applicable and sufficiently explanatory indicators, as there is highly unlikely to exist any individual at a financial institution sufficiently familiar with the mathematical analysis of each constituent of a substantial equity universe to be able to approximate a quantitative solution. Elton and Gruber concluded that there is no non-overlapping organizational structure that would permit security analysts in a financial institution to produce estimates of correlation coefficients between all relevant pairs of stocks, since each analyst follows a subset of the stocks in which the institution has an interest.

In an effort to address the lack of reliable indicators of the correlation in how securities perform, traditional models such as the capital asset pricing model (CAPM) assume that all residual pairwise correlations are zero. That is, it is assumed that each security has no relationship to any other security in excess of co-movement with the market as a whole. This assumption lacks realism: a simple likelihood ratio test for zero correlations rejects the null hypothesis of zero residual pairwise correlations at the 0.000001 significance level.

Elton and Gruber illustrate that the CAPM can be improved upon simply by assuming a single nonzero pairwise correlation to be assigned across an entire portfolio, but acknowledge the severe limitations of this approach. The challenges referenced above, and the lack of a well-developed, field-specific framework to address the covariance issue at scale, have left the problem unsolved. The increasing scale, complexity, and heterogeneity of modern portfolios have made this challenge more acute.

Purely quantitative measures of correlation have proven least accurate and least predictive precisely when they are most needed: during bubbles, crashes, and other periods of high market volatility, when these measures have deviated far from their historical norms. Investors who have sought to diversify principally based on quantitative historical covariances have sustained extraordinary losses during recent periods of market volatility.

Factor Models

Asset pricing models such as the CAPM frequently have failed to accurately describe or predict performance characteristics of securities, groups of securities, or portfolios. These models isolate a very small number of factors believed to be driving security price returns and are predicated on the assumption that they can be determined purely quantitatively.

The CAPM relies on the risk free rate, the market return, and the idiosyncratic risk of the security; in other words, it is predicated on the assumptions (among others) that there is one factor F common to all securities in the market, there exist a set of factors $f_{1, 2 \ldots n}$ which map precisely, in a one-to-one correspondence, to the set of securities $s_{1, 2 \ldots n}$, that these factors and their weights are essentially stable over time, and that the relationship among these factors and their weights is entirely unknown.

The Fama-French three-factor model adds size and book to market value to the aforementioned factors, while their posited five-factor model, which, as of November 2013, also adds profitability and asset growth, does not yet appear to improve on their previous model. (Eugene Fama and Kenneth French, "A Five-Factor Asset Pricing Model," working paper, September 2014.) Carhart's posited four-factor model adds momentum to the three-factor model. (Carhart, M. M., "On Persistence in Mutual Fund Performance," *The Journal of Finance* 52: 57-82 (1997).) Tobias Adrian, Emanuel Moench, and Hyun Song-Shin point to the systemic impact of aggregate broker-dealer capital structure and asset growth in non-banking financial institutions on equity and bond prices. (Tobias Adrian, Emanuel Moench, and Hyun Song Shin, "Financial Intermediation, Asset Prices, and Macroeconomic Dynamics," Federal Reserve Bank of New York, 2010.) Andrew Lo and Amir Khandani add common factors such as general market volatility and commodity prices, and emphasize liquidity as an additional factor at the security level which was unduly neglected in studies of large and mid-cap stocks in developed markets during periods of little turbulence, when liquidity factors are less relevant. (Andrew Lo and Amir Khandani, "Illiquidity Premia in Asset Returns," draft paper, June 2009.)

Methodologies focusing first on quantitative analysis that have failed to identify any factors or risks other than systematic and idiosyncratic, or the relationship among the various idiosyncratic factors or risks, and a lack of computing power when many of the key paradigms of finance were formulated, have led portfolio and index construction to be predicated on the assumption that all drivers of security price returns either a) affect every security in the entire market precisely the same way, or b) affect only one security in the entire market in any way at all. This untenable assumption has made effective portfolio and index construction extremely difficult.

Problems of Scale

For multiple reasons, the problems described above are particularly acute in large-scale portfolios of securities. Various reasons why management at scale is difficult are provided below.

(a) Charter limits on ownership: For many funds and fund managers, there are limits on the percentage of a company they can own. For example, for any fund that seeks to acquire a 5% holdings of U.S. public equities, there are required 13-D filings and more extensive regulatory oversight. Many funds will not or cannot cross that threshold.

(b) Liquidity limits on ownership: The more a fund owns of an individual security, particularly for large holdings, the harder it generally is to sell. The effect is frequently trivial for small dollar value holdings in liquid securities, but may be significant for larger holdings or relatively illiquid securities.

(c) Large funds need a large number of securities to fill out a portfolio: Due to the factors identified above as well as other practical issues, a large fund needs a large number of companies to invest in due to liquidity and ownership issues. Across an economy, there are many linkages among companies, and the larger the number of companies under evaluation, the more difficult it is to track and oversee the linkages and risks that come from them.

(d) Large funds may face a limited selection of securities: Due to the factors identified above as well as many more practical issues, large funds often need to invest disproportionately in large companies or other funds. The available companies in this group vary over time. In addition, these securities have variable weights and aggregate differently depending on what companies exist in which category at any given point in time.

(e) Geographic variation: In addition to changes over time, this industry, sector, or company selection varies by geography; in large portfolios, indices, or funds comprised of securities, determining the geographic exposure of assets, operations, and products, as non-limiting examples, is impracticable using prior art methods. Sector differentiation may be a greater cause of price movements between geographies than the underlying currency that drives the products. For example, portfolios of US securities are often more heavily weighted in technology stocks than portfolios of European or Latin American securities. Europe and Latin America are relatively heavy in manufacturing and financials.

If a fund, index, or portfolio manager's goal is currency differentiation, it is important to control for these sector variations. Not only understanding the different potential risk groups that exist at any given point in time and in any specific geography or category, but also being able to control for these risks is difficult using currently or previously known techniques.

(e) Attribute and overconcentration risk are multi-dimensional: Single and multiple attributes are helpful in distinguishing risks in individual companies, but attributes that are clear on an individual level are lost in larger classification systems. These varied, yet critical, attributes impacting security price returns are often aggregated into one technology metacategory in large-scale funds. The existing categories in current systems tend to be standardized on a global basis and do not permit differentiation among these attributes that aggregate to characterize each metacategory. The inability to represent linked multi-attribute risks is a significant limitation for existing large-scale investment portfolios.

If portfolios, and large-scale portfolios in particular, are not better controlled, and the linkages between companies are not well understood, non-systematic events can appear to have systematic impact. Examples of non-systematic events are provided below. Known and existing classification systems do not address the underlying statistical causes for the systematic impact of the volatility of the constituents of large-scale portfolios of securities. With improved controls, however, the impact of non-systematic events could be limited.

BRIEF SUMMARY OF THE INVENTION

Without both a reliable and validated classification system using functional attributes as well as a computerized system that uses a stratified or segmented (or blocked) composite structure, prior art systems are unable to control for the different attributes associated with the securities. A stratified or segmented composite portfolio can be formed by selecting a group of investment securities, segmenting the securities into sub-groups according to attributes that correlate to one or more identified investment security risks, and assigning portfolio weights to one or more sub-groups based on their stratified or segmented positions. The attributes can be selected from a universe of possible values. Further positive and negative biases can be applied at any arbitrary point, stratum, or segment, including to individual investment securities, groups of arbitrarily selected investment securities, or arbitrary positions in the architecture.

The specific functional attributes associated with the investment securities can be used to segment, stratify, and weight the holdings of investment securities in a portfolio by assigning specific weights to the risk groups in which the underlying securities are held in order to meet the engineered risk objectives of the overall portfolio. As a non-limiting example, one of the goals in segmenting or stratifying risk groups may be to reduce the impact of attribute-specific volatility drag on the portfolio as a whole. As non-limiting examples, the systems and methods described herein can be used in investment management by controlling for specific types of random events that impact the overall randomness of risk, return, skewness, and kurtosis in large portfolios or groups of investment securities.

Multi-attribute risk composites can provide a tool to manage risk by reducing or minimizing the potential risk resulting from these attributes and/or increasing or maximizing the potential return from these type of risks by engineering the composite to take advantage of an event a manager expects to happen.

In some embodiments, a stratified composite portfolio can be created by tagging securities with risk attributes based on functional attributes and applying a weighting scheme that limits the exposure to individual attributes. The result of this process is a weighted portfolio that stratifies or segments risk exposure across a number of risk attribute categories, and disperses the risk in the individual groups and sub-groups according to attribute categories within groups, to achieve a desired risk profile that can be represented by a target score.

In one aspect of the disclosure, there is provided a computer-implemented method for storing a representation in a database of an index or portfolio of investment securities, the method comprising electronically storing one or more data entities in a database system, each of the data entities representing the identity of an investment security, the investment security associated with a corresponding economic entity; electronically tagging each data entity with one or more functional attributes of the corresponding economic entities; wherein the functional attributes characterize the roles of each of the economic entities in one or more processes converting inputs to outputs; selecting multiple investment securities represented by the data entities for inclusion in an index or portfolio of investment securities; defining at least a first group and a second group of investment securities based on the electronic tags or the functional attributes associated with the corresponding economic entities; segmenting the selected investment securities into the two or more groups based on the electronic tags or the functional attributes; wherein the investment securities in the first segmented group share a first common or proximate functional attribute, and the investment securities in the second segmented group share a second common or proximate functional attribute; electronically accessing the database representation of the segmented groups; electronically iterating through the accessed representations to compute a negative or positive weight for one or more of the investment securities based on the one or more segmented groups into which the investment securities are segmented; and assigning the negative or positive weight to the one or more of the investment securities; and electronically storing the assigned weight in the database system.

Further embodiments include selecting one of the segmented groups of investment securities which share a first common or proximate functional attribute; segmenting the selected group of investment securities into two or more sub-groups, wherein the sub-groups are subsets of the segmented groups; weighting the two or more segmented sub-groups; wherein the investment securities in a first sub-group share a third common or proximate functional attribute and the investment securities in a second sub-group share a fourth common or proximate functional attribute.

In further embodiments, the joint intersection of each set of groups is the empty set; and the joint intersection of each set of sub-groups is the empty set. In further embodiments, one or more groups, sub-groups, or investment securities are weighted based on syntactic or functional tags, or syntactic or functional attributes; and one or more groups, sub-groups, or investment securities are weighted based on non-syntactic, non-functional tags, or non-syntactic or non-functional attributes.

Further embodiments include assigning a target weight to a group, sub-group, or investment security; and periodically rebalancing the group, sub-group, or investment security to the target weight.

In further embodiments, one or more portfolios, indices, groups, sub-groups, or securities, or the data entities representing them, are represented in graphical, sequential, clustered, or networked form.

Further embodiments comprise electronically using predictive analytics based on functional attributes to forecast the performance, volatility, liquidity, variance, expected return, alpha, Jensen's alpha, beta, variance, covariance, semivariance, semideviation, correlation, autocorrelation, Sharpe ratio, Sortino ratio of one or more portfolios, groups, sub-groups, or investment securities, or the excess or residual of any of these metrics.

In further embodiments, one or more weights are assigned to an investment security based on a functional attribute of a corresponding economic entity, or electronic tag representing such an attribute.

Further embodiments comprise transmitting, sending, or relaying information regarding one or more data entities and one or more weights to an exchange, index provider, index calculator, brokerage, asset manager, investment advisor, investment manager, specialist, broker-dealer, authorized participant, trader, financial professional, investment professional, investor, general partner, limited partner, private equity investor, venture capital investor, hedge fund investor, conglomerate manager, executive, pension fund advisor, endowment manager, fund manager, or securities trading platform.

Further embodiments comprise using one or more weights to construct an index, buy, sell, issue or transmit an order, or execute trades in an investment security, group, or portfolio.

In further embodiments, the functional attributes are associated with risk exposures, and wherein at least two groups of investment securities are associated with different functional attributes and different risk exposures.

Further embodiments comprise associating two or more numerical values with two or more groups, tags, attributes, risk exposures or relationships, wherein the numerical values relate to economic, financial, or capital markets-based data; associating a statistical property, selected from among mean, variance, standard deviation, skew, kurtosis, correlation, semivariance, and semideviation, with those groups, tags, attributes, risk exposures, or relationships based on the numerical values; calculating two or more statistical values associated with the statistical property; determining the statistical significance of the calculated statistical values of each group, tag, attribute, risk exposure, or relationship; validating that the statistical values are significant at a predetermined level; and if the values are not significant, reassigning groups, tags, attributes, risk exposures, or relationships.

In further embodiments, the number of securities in each group is chosen such that a statistical power of the statistical test exceeds a predetermined level.

In further embodiments, the investment securities or groups are selected from among equity, debt, derivatives, currencies, commodities, funds, notes, alternative investments, exchange-traded products, real assets, and structured products.

Further embodiments comprise selecting a financial or economic metric to measure with respect to one or more of the groups, indices, or portfolios, wherein: the distribution of expected or realized values of the metric for the index, portfolio, or group is relatively more normal than the distribution of expected or realized values of the metric for an alternative index, portfolio, or group; or the value of the metric is more stable or predictable for the index or portfolio than it is for the group, as measured by a mathematical test of stability or predictability; or the value of the metric is more stable or predictable for the group than it is for an investment security, as measured by the mathematical test of stability or predictability. In some further embodiments, the normality of the distribution is assessed using Cramér-von Mises criterion, Kolmogorov-Smirnov test, Shapiro-Wilk test, Anderson-Darling test, Jarque-Bera test, Siegel-Tukey test, Kuiper test, p-value test, a Q-Q plot, a test of skewness, or a test of kurtosis. As non-limiting examples, stability may be assessed through a test of variance or a test of heteroscedasticity.

Further embodiment comprise electronically storing one or more data entities, each of the data entities representing the identity of a segmented group, the segmented group comprising one or more investment securities and associated with one or more corresponding economic entities; and electronically tagging each group with one or more functional attributes of the corresponding economic entities.

Further embodiments comprise identifying an index or benchmark to track; selecting, grouping, or weighting the investment securities so as to track substantially or replicate the performance of the identified index or benchmark.

In further embodiments, the portfolio or index comprises a synthetic conglomerate.

In further embodiments, one or more weights are assigned based on semantic, syntactic, morphological, morphosyntactic, anatomical, physiological, functional, graphical, or value chain proximity.

Further embodiments comprise electronically storing a computerized representation of an economic systems syntax, wherein the economic systems syntax can be applied by a computer processor to establish the validity of expressions of elements of the system based on one or more functional properties of the economic entities.

Further embodiments comprise recommending a portfolio, group, or investment security to a user based on functional attributes electronically identified by the system or user.

Further embodiments comprise arranging the selected data entities into a stratified structure including at least two parent groups and at least two sub-groups of each parent group such that: one or more parent groups are defined by one or more functional attributes such that data entities of those parent groups have in common the attributes that define those parent groups and wherein at least two parent groups are associated with different risks; the sub-groups inherit one or more functional attributes and corresponding risks from the parent groups; and the sub-groups are defined by one or more divergent functional attributes such that one or more sub-groups are associated with different risks from the parent groups and from other sub-groups.

Further embodiments comprise calculating a measure of statistical dependence between each of two parent groups and between each of two sub-groups; determining whether the parent groups and sub-groups have relatively high intra-group statistical dependence; determining whether the parent groups and sub-groups have relatively low inter-group statistical dependence; and if the intra-group statistical dependence does not exceed the inter-group statistical dependence, reorganizing the groups or sub-groups.

In further embodiments, one or more sub-groups are assigned weights relative to one another according to a weighting scheme such that the weight of one or more parents equals the sum of the products that result from multiplying a sub-group by its assigned weight according to the weighting scheme.

In further embodiments, the realized returns of the portfolio exceed those of a commercially available index or benchmark, over the previous one, three, and five years for a given level of risk, or match those of the index or benchmark at a lower level of risk; wherein the securities in the portfolio are the same, or substantially the same, as the securities in the index or benchmark.

In another aspect of the disclosure, there is provided a computer-implemented method for storing a database characterization of an index, portfolio, set, aggregate, or composite of elements of a functional system, or of a representation of those elements, the method comprising: electronically storing a set of data entities in a database system, each of the data entities corresponding to an element of a functional system; wherein the functional system comprises a group of elements ordered by their functional roles in converting inputs to outputs, or as the inputs, or as the outputs; electronically assigning each data entity associated with an element one or more functional attributes represented as an electronic tag; wherein the functional attributes characterize the roles of each of the elements in a process of converting inputs to outputs; selecting multiple elements, or a representation of those elements, characterized by data entities for inclusion in a portfolio, index, set, aggregate, or composite; segmenting the selected elements, or a representation of those elements, into two or more defined groups based on the electronic tags representing the functional attributes associated with the corresponding elements; wherein the first group shares a first common functional attribute, and the second group shares a second common functional attribute; electronically accessing the database representation of the segmented groups; electronically iterating through the accessed representations to compute a negative or positive weight for one or more of the elements, or a representation of those elements, based on the one or more segmented groups; and assigning the negative or positive weight to the one or more of the elements, or a representation of those elements; and electronically storing the assigned weight in the database system.

In further embodiments, the functional system is economic; the elements comprise one or more inputs, outputs, resources, activities, functions, businesses, enterprises, jobs, companies, projects, products, assets, shareholder's equity, liabilities, commodities, currencies, imports, exports, communities, or economic interests in, or collections of, any of the foregoing, in the economic system; investment securities represent the elements of the economic system; wherein one or more investment securities, or one or more groups, are selected from among equity, debt, derivatives, currencies, commodities, funds, notes, alternative investments, exchange-traded products, real assets, and structured products; and one or more data entities identify one or more investment securities.

In another aspect of the disclosure, there is provided a system for executing a command in a computing environment to construct a representation of an index or portfolio of investment securities in a database, the system comprising: a computerized processor configured for: electronically tagging one or more data entities with one or more functional attributes of the corresponding economic entities; wherein the functional attributes characterize the roles of each of the economic entities in one or more processes converting inputs to outputs; selecting multiple investment securities represented by the data entities for inclusion in an index or portfolio of investment securities; defining at least a first group and a second group of investment securities based on the electronic tags or the functional attributes associated with the corresponding economic entities; segmenting the selected investment securities into the two or more groups based on the electronic tags or the functional attributes; wherein the investment securities in the first segmented group share a first common or proximate functional attribute, and the investment securities in the second segmented group share a second common or proximate functional attribute; electronically accessing the database representation of the segmented groups; electronically iterating through the accessed representations to compute a negative or positive weight for one or more of the investment securities based on the one or more segmented groups into which the investment securities are segmented; and assigning the negative or positive weight to the one or more of the investment securities; and an electronic data store configured for: electronically storing the one or more data entities in a database system, each of the data entities representing the identity of an investment security, the investment security associated with a corresponding economic entity; electronically storing the assigned weight in the database system.

In further embodiments, the computerized processor is further configured for: selecting one of the segmented groups of investment securities which share a first common or proximate functional attribute; segmenting the selected group of investment securities into two or more sub-groups, wherein the sub-groups are subsets of the segmented groups; weighting the two or more segmented sub-groups; wherein the investment securities in a first sub-group share a third common or proximate functional attribute and the investment securities in a second sub-group share a fourth common or proximate functional attribute.

In further embodiments, the computerized processor is further configured for: selecting one of the segmented groups of elements, or representations of those elements, which share a first common or proximate functional attribute; segmenting the selected group of elements, or representations of those elements, into two or more subgroups, wherein the subgroups are subsets of the segmented groups; wherein the groups of elements, or representations of those elements, in a first subgroup share a third common or proximate functional attribute and the elements, or representations of those elements, in a second subgroup share a fourth common or proximate functional attribute.

BRIEF DESCRIPTION OF THE DRAWINGS

FIG. 3 illustrates an example stratification with three levels.

FIGS. 8A-8B illustrate an example architecture represented as statements defining an architecture and barcode.

DETAILED DESCRIPTION

Definitions

Figure 1:
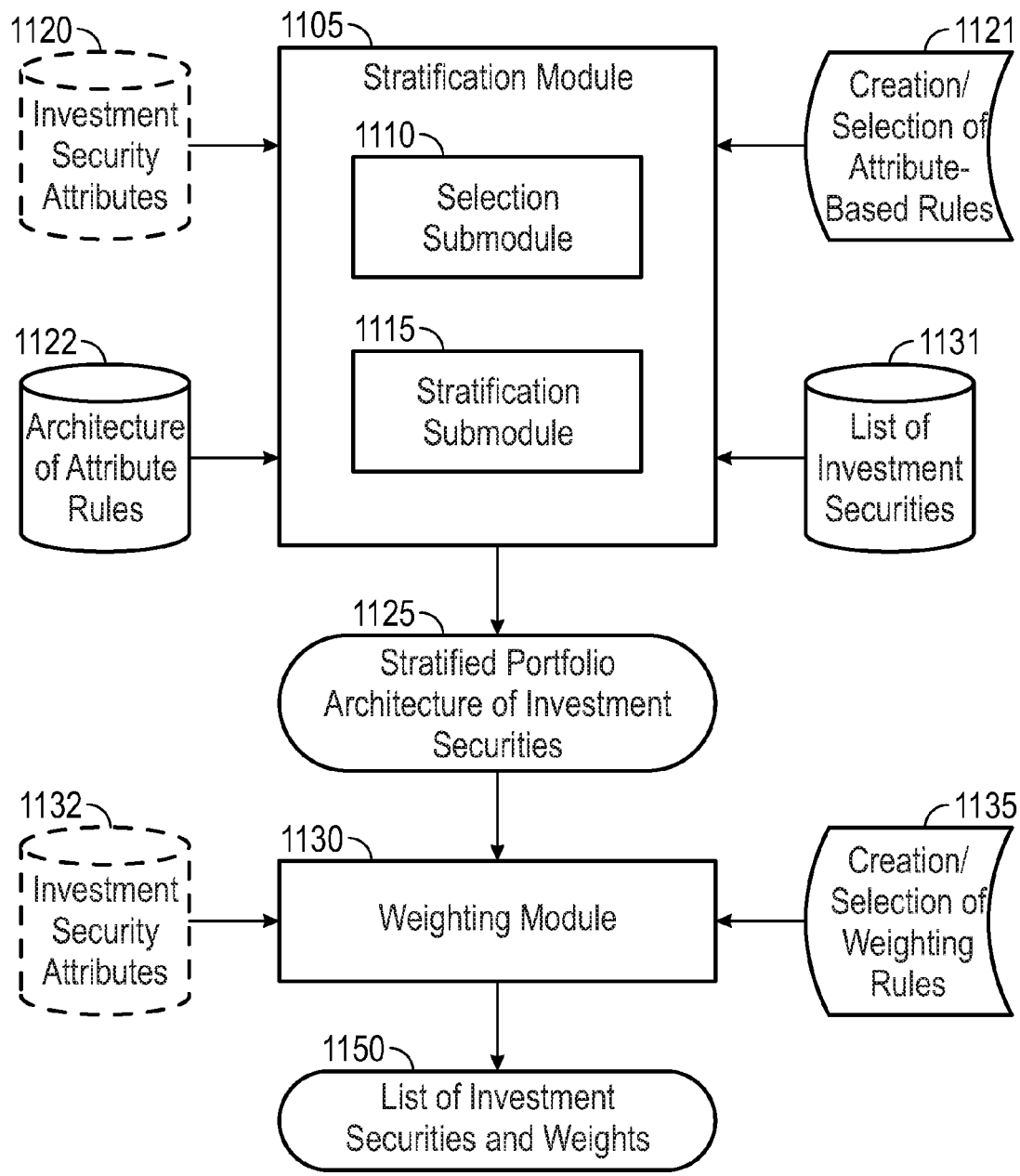
FIG. 1 illustrates an example method for creating a stratified composite portfolio and weighting investment securities.

Investment Security: As used herein, an investment security is defined as a financial instrument that can represent, as non-limiting examples: an ownership position in a corporation (stock), a commodity, or a collection of assets; a securitized creditor relationship with an institution, such as a corporation, multilateral, or governmental body secured directly or indirectly by the assets of the issuer (bond); potential rights of purchase, sale, or ownership as represented by an option or other derivative instrument; a security interest in a commodity or real asset, including, as non-limiting examples, energy, timberland, and precious metals; a group of other securities pooled into a security, including, as non-limiting examples, a fund, exchange-traded fund, exchange-traded product, or structured product; or any collection thereof. A security may be a fungible, negotiable, financial instrument that represents a type of financial value associated with an economic entity. The company or economic entity that issues the security is known as the issuer. The value of the security value can be based on the type of security, the type of relationship with the issuer, and the type of assets and liabilities that are directly or indirectly associated with the security.

Economic entity: As used herein, an economic entity is involved in some capacity, whether active or passive, in the production, distribution, trade, or consumption of real or virtual goods or services. As non-limiting examples, an economic entity may be a corporation, company, enterprise, business, work group, department, laborer, input, output, resource, activity, function, project, product, assets, liability, commodities, currencies, imports, exports, community, job, worker, individual, governmental body, intergovernmental organization, multilateral organization, non-governmental organization, social enterprise, charity, non-profit, or any collection thereof. As non-limiting examples, an economic entity may pursue financial, environmental, social, or governmental objectives, or some combination thereof.

Functional Attributes: The economic entities represented by the investment security can be associated with or have attributes. Functional attributes characterize the roles of the economic entities in processes converting inputs to outputs. The database system can operate on multiple types of attributes associated with an entity. As non-exclusive examples, the database system can operate on classes of attributes that are: (a) relative, and/or (b) functional, and/or (c) contextual; and/or (d) absolute. Relative attributes may be, for example, syntactic attributes, geographic, temporal, scoring systems, designations as high/low volume securities or as growth/value securities.

In some cases, attributes can be defined to include attributes relating to the entity associated with the security and correspondingly exclude attributes of the security itself. For those embodiments, the database system can be configured to define attributes so as to specifically exclude attributes relating to the type of investment security, such as equity, debt, or derivative, and characteristics of the investment security, such as preference, maturity, duration, or strike price. In those configurations, those excluded attributes are not considered to be functional attributes because the included attributes relate to the economic entity with which the investment securities are associated, not the security itself.

In some embodiments, functional attributes can be applied to inputs, outputs, or functions transforming inputs to outputs. In other embodiments, functional attributes may apply to activities, resources, systems, subsystems, composites, or elements. As non-limiting examples, types of functional attributes can be: syntactic attributes or semantic attributes. Examples of functional attributes may include, as non-limiting examples: (a) attributes related to investors (e.g. "institutional" v. "non-accredited"), (b) attributes of assets belonging to the company (e.g., "outsourced" vs. "in-house" for a manufacturing company), (c) attributes related to the product (e.g., "raw material" vs. "simple component"), (d) attributes related to customers (e.g., "business" v. "consumer" v. "government"), and (e) attributes related to suppliers (e.g. "wholesale" v. "retail"). The system can recognize any combination of different types of attributes. Some attributes may have qualities that are both relative-to-universe and functional.

In some embodiments, functional attributes can be defined to exclude accounting and performance-based attributes. In some embodiments, the functional attributes can be qualities, features, properties, or inherent characteristics of the underlying entity or assets with which an investment security is associated. Functional attributes may define relationships throughout the value chain and structure of an economic entity, including, as non-limiting examples: (a) what a company does, such as manufacturing or transportation; (b) aspects of the company's product, such as specific utility provided by the car, computer or couch; (c) what the company's customer does, such as consumer sales or business intelligence; (d) what the customer's customer does; (e) the products and materials a company uses to provide its product; (f) the multivariate industries or industry segments in which a company may operate; (g) the structure of a company's business, such as integrated, non-integrated, forward integrated, backward integrated or networked; (h) risks based on a company's management, including its decisions and strategies; (i) risks based on the internal operations of a company.

A major part of the linkages in an economic system are due to non-systematic functional attributes associated with, as non-limiting examples, a company's suppliers, products, industry, and operations, and geographic location. Without a comprehensive awareness of such shared attributes or linkages, it is very easy for portfolios with a large number of securities to become over-concentrated in non-systematic risk categories.

At any given point in time, any one of these attributes or an industry event related to these attributes may affect the risk associated with securities associated with entities that have these attributes. Understanding different potential risk groups and controlling for them is difficult without both a reliable and validated system of functional attributes as well as a stratified or segmented composite architecture to control for the different attributes.

Functional attributes may be syntactically or semantically structured; they can be framed in natural or symbolic, relational language using the methods described in U.S. patent application Ser. No. 14/216,936, the contents of which are hereby incorporated by reference herein. Any combination of multiple attributes can be formed as a compound attribute. Compound attributes can be defined as a new single attribute.

Figure 4:
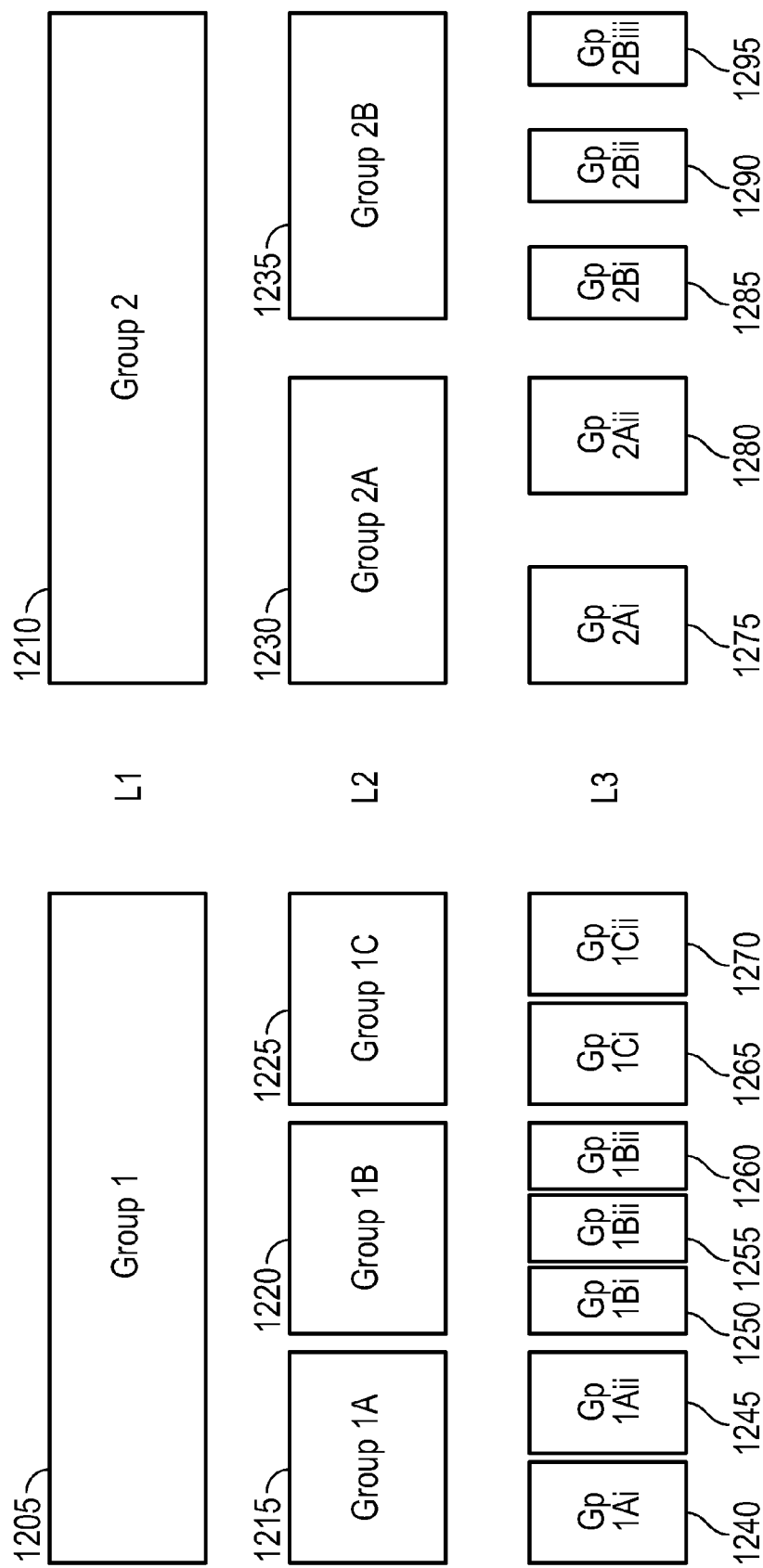
FIG. 4 illustrates an example data set consistent with the example three-level stratification.

Stratified Composite Unit: As used herein, a stratified composite unit is defined as a stratified set of investment securities comprising: 1) a parent group that is defined by one or more attributes where all members of the parent group have in common the attributes used to define the parent group; and 2) at least two sub-groups of the parent group, which may be considered to be children of the parent group and/or siblings of each other. All members of a sub-group have in common the attributes used to define the sub-group and its parent group. Any stratified composite unit and its constituent sub-units can include an arbitrary number of other sub-units that follow the rules of its parent unit or sub-unit. In some cases, a stratified composite unit may be comprised of only a parent group and two sub-units. In other cases, a stratified composite unit may be comprised of as many parts as the size and diversity of the original parent will support. With reference to FIG. 4, a stratified composite unit can comprise elements 1210, 1230, and 1235.

Segmented Composite Unit: As used herein, a segmented composite unit is defined as a segment for securities comprising: 1) a segmented group defined by one or more shared attributes; 2) at least two sub-segments of the larger segmented group, each of which contains constituent securities that share at least one attribute in common with one another and with the larger segment group. In some cases, a segmented composite unit may be comprised only of a larger segmented group and two sub-segments. In other cases, a segmented composite unit may be comprised of as many segments as the size and diversity of the larger segment will support. A security may be a constituent, in whole or in part, of one or more larger segmented composite units. With reference to FIG. 4, a segmented composite unit can comprise elements 1205 and 1210.

Stratified Composite Portfolio: As used herein, a stratified composite portfolio is defined as comprising at least two stratified composite units wherein the attributes of the parents in the composite units represent risk groups such that: 1) parent risk groups have differentiable risk profiles; and, 2) the sub-units comprising investment securities in risk groups are formed as stratified composite units.

Segmented Composite Portfolio: As used herein, a segmented composite portfolio is defined as comprising at least two segmented composite units wherein the attributes of the larger composite units represent risk groups such that: 1) larger risk groups have differentiable risk profiles; 2) the sub-segments comprising securities in risk groups are formed as segmented composite units.

While there may be other qualifications to be in the parent or larger grouping of a stratified or segmented composite unit, respectively, composite unit parents can satisfy the condition of sharing a specific common attribute or sets of common attributes with the members. A parent grouping of the multiple stratified composite units can comprise a stratified composite portfolio defined to create a portfolio of composite units so that a defined differential risk is addressed by the composite units that comprise the stratified composite portfolio.

Portfolio: A portfolio, as used herein, can be any form or collection of investment securities held by an investment company, institution, or individual.

Introduction to Risk

Investments are made with an expectation of appreciation, or return, and of potential risk, or variance of these returns. The two measures are linked: at a given level of liquidity, the higher the expected risk, the higher the expected return. Stated differently, all else being equal, higher levels of risk should be compensated for by higher levels of return. The probability of return is linked to the expected variance of outcome for a given security. The actual return expected for a security may be tied to many factors including market conditions, a given supply of investment capital, or an expectation of inflation or deflation. For example, identifying that a company is in the semiconductor business is a differentiable risk. Furthermore, the type of semiconductor (e.g., storage, processing, linking) is important, as are the raw materials required and the identities of the customers.

Securities vary in their return characteristics and expectations. Certain types of securities represent a specific ownership position in a specific company. Each type, such as a bond, an equity instrument, or a derivative, has its own specific ownership and investment characteristics. The expected return from a security is based on the type of security and its characteristics and the underlying performance of the associated entity relative to the ownership represented by the security. For any security, the expected return and the actual return may be materially different. Theory and empirical results alike illustrate that divergence at the security level is substantially higher for equities than relatively safe fixed-income instruments such as investment-grade government bonds.

An investment security's expected rate of return (and volatility) depends on factors including both market forces and forces tied to the specific investment security and its underlying properties. The former forces are systematic and impact broad classes of securities. The latter are specific and unique to each specific investment security, being tied to the attributes of each specific investment security or groups of securities. The variance of investment security returns that are tied to the latter are tied to attributes of the specific securities which are shared in numerous segments of heterogeneous populations.

Risk can be associated with the qualities or attributes of the entity with which the security is associated. The changes in fortunes or even bankruptcy of a specific business are related to the functional attributes of the business itself. These include any number of factors including the business, its operations, its products, its customers, its customer's customer, the availability of supplies, the strength of their suppliers or the specific assets or liabilities of the business. Events related to any one of these things or any combination of these things can cause the fortunes of a business to change and, in so doing, change the expected return of a business associated with a security.

In addition to an individual company, a portfolio of securities can be impacted by these non-systematic risks if the portfolio is over-exposed or over-concentrated in a specific non-systematic risk. One of the principal reasons for having a portfolio is to reduce this exposure to non-systematic risk by spreading it out over a number of investments with unique or disparate non-systematic risks such that no one non-systematic risk will materially change the fortunes or expected return of the overall portfolio. This strategy is relatively easier for an individual investor who can diversify a portfolio over a relatively small number of individual securities in relatively small amounts. However, this strategy has proven elusive for large-scale investors such as pension funds or endowments that have billions of dollars (or dollar equivalents) to invest. Those large-scale investors must invest in hundreds or thousands of securities at any given point in time representing billions of dollars of value. For investors with that scale of investment, minimizing the impact of non-systemic risk factors in a portfolio has proven very difficult; they tend to overweight in large industry bubbles and are negatively affected by repeated technology or commodity bubbles and continual over-weighting in large bankruptcies or large downgraded classes of financial instruments such as mortgage-backed securities or sovereign debt. The invention disclosed herein provides a method for portfolio managers to systematically control for these non-systematic portfolio risks that disproportionately and negatively impact large-scale portfolios.

Functional Attributes

Functional attributes can be used in the multi-attribute weighting scheme described herein. The systems described herein can operate by assigning one or more attributes to companies associated with an investment security. The methods described herein can be implemented on a computing device to group a portfolio of investment securities into subsets using the functional attributes related to their associated companies, commodities, assets, or liabilities. These attributes can be used as markers for the specific risks associated with events such as bankruptcy or market crashes. These attributes enable a portfolio manager to stratify, segment, or sub-divide a portfolio into groups according to attributes, where each group represents a specific attribute-related risk. When constructed in a stratified form, the children of these parent groups have both unique risks between groups and share common risks with their parent.

After stratifying or segmenting a portfolio, weights can be assigned to the units and a plan to reconstitute the weightings on a systematic basis can be executed. In this way, a portfolio manager can understand and manage the specific risks in the portfolio. Additionally, risk levels can be engineered by arbitrarily setting weights for the stratified units. In some embodiments, the manager can determine the desired risk at the beginning of the process, using these to form a multi-level hierarchy of distinct groups and subgroups, and then weighting the groups according to a desired risk outcome. In other embodiments, the groups are used to form non-hierarchical segments, clusters, or groupings and then weighted according to a desired risk outcome.

The methods described herein enable the calculation and implementation of weighting schemes for portfolios and their constituent securities, each of which have specific properties that are different from those of uncontrolled portfolios of the same securities based on security or group-specific attributes. As described in more detail below, the invention uses a set of security-specific functional attributes that are syntactically and semantically related to constituents to reduce the portfolio-level effects of the randomness of individual security returns by building portfolios of securities that reduce the impact of the risks associated with functional attributes. It does so by stratifying and segmenting the attributes and their risks in a controlled manner over a controlled portfolio of population groupings, representing groupings defined by common attributes and groupings containing specific securities that share the attributes associated with the grouping.

Stratification and Segmentation

To control for non-systematic risk, a portfolio manager must control for the specific set of business risks that exist in any portfolio. These risks could be, among other things, company-related, industry-related, product-related, customer-related, or supplier-related. The larger a portfolio becomes, the more difficult it is for a portfolio manager to understand its exposure to specific non-systematic risks. The methods of risk group stratification described herein reduces the negative impact of attribute-specific volatility on the portfolio as a whole.

The systems described herein can be used to create a stratified architecture or segmented sets of specific risk groups, allocating the securities in a portfolio across these stratified or segmented risk groups and selecting the desired exposure to the risk groups by applying calculated or user-provided weights for identified non-systematic risks. Thus, stratification or segmentation can be used to systematically control exposure to non-systematic risks. These exposures can then be managed over time by creating rebalancing rules that reset on an appropriate periodic schedule a portfolio's exposure to these identified non-systematic risks. In this way, a large-scale securities portfolio's exposure to a set of non-systematic risks can be systematically determined and managed.

The systems can include a programmable coordinate-guided system to produce computer-generated risk groups and programmable assembly of computer-generated risk groups into computer-generated portfolios of these risk groups each containing securities that match the attributes of the specific group.

Economic entities with one or more common functional attributes correlate with events that are associated with that attribute or set of attributes. The measure of correlation will vary by the level of importance of that attribute in a specific business. For example, if all network equipment companies share the same customers, the loss of a major customer like Cisco, a giant network company, will impact all the companies. The impact, however, will be greater if Cisco is the company's sole customer than if Cisco is less than 5% of a company's business. In this way, grouping companies in risk groups that are defined by attributes provides a method for portfolio managers to organize, segment, or stratify securities in groups that correlate with specific attribute-related events. In addition, most attributes are, in turn, part of larger attribute groups. When the large telecommunications company Nortel went bankrupt, all the companies that shared it as a customer were also part of a network equipment group which in turn was part of a communication equipment group which in turn was part of a larger digital technology group, all of which were exposed to the bankruptcy. In this way, using functional attributes enables a portfolio manager to group securities by both broad and narrow categories and by the importance of these categories in determining the performance of individual securities.

Endogenous economic models characterize functional-attributes, which represent risk-related properties, qualities, or characteristics. Coding for these attributes in a coordinate-based or ordered tagging system enables a computer to associate tags with specific risks and generate company groupings that share these attributes. These risk-based computer-generated groupings may be tested, as a non-limiting example, for correlations with their constituent companies, with other groups, other tags, or other individual companies or securities. In an iterative process, a computer can use the tags in this way to test and validate the statistical importance of different computer-generated groupings or individual tags used to build computer-generated risk-controlled portfolios of securities that have unique risk characteristics derived from the computer-generated groupings. Further, the computerized system described herein can be used to generate an assembly of groupings, including, as a non-limiting example, a risk-stratified portfolio consisting of stratified groupings of statistical control groups.

The process of stratification or segmentation can include dividing a population into subsets (called strata or segments) within which one or more investment securities scan be placed. Stratification and segmentation can be used in the statistical management of the portfolio, as they are used to divide a population into parts or subsets. The creation of defined subsets which are assigned defined proportions enables the creation of controls to population outcomes through statistical methods.

A properly stratified or segmented population can be termed a control group because its constituents and the weights of the subsets are defined and can be tested. In any heterogeneous population, there tends to exist random variance wherein a subset of the population has different characteristics, properties, or qualities than the population as a whole. The impact of these divergent sub-populations can be mitigated by grouping the population into sub-populations that are expected to behave differently and then ensuring that some of each sub-population is used in studying the population as a whole. As an example, if one were studying the output of workers, one might find that workers on Monday morning were less efficient than the entire rest of the week. However, if one did a random sample of 20 days worked during a year, one might randomly receive a sample set that was abnormally biased toward Mondays. This would not be representative of the workers as the dataset was skewed to the one period when workers were least efficient. In an effort to eliminate this bias, one might stratify the population set across five subsets consisting of one subset for each day of the week. Random sampling would entail assigning each subset an equal number of worker days so that the entire sample consisted of five subsets, each with an equal number of example days. In this way, stratification can limit biases in a sample set and increase the probability of a representative outcome.

Stratification provides controls that can: 1) ensure an unbiased sample set that is representative of the entire population; or, 2) ensure a specific exposure to increase the likelihood of an outcome that is desired but not necessarily representative of the underlying population. An example of the former is in clinical trials or experiments in the social sciences. In those cases, the experimenter is attempting to form a representative sample set against which assumptions can be varied to investigate how they impact the controlled population. An example of the latter is in risk management, where different population subsets are designed to be relatively uncorrelated and have highly divergent occurrences or variations. In that case, the statistician may want to weight the sample set towards a specific subclass, such as subsets that have relatively higher or lower volatility. In both cases, stratification enables the statistician to build sample sets with relatively predictable outcomes based on the type of stratification model being implemented. The strata generally are formed based on members' shared attributes or characteristics. These attributes could be based on physically identifiable attributes such as color of hair, skin or eyes, right-handedness or left-handedness. In addition, the attributes could be based on relative quantitative metrics of a population, such as size, speed, or age of a population.

In the context of investment securities, the value of an investment security can be directly or indirectly related to: 1) the type of assets, liabilities, or operations that are directly or indirectly associated with the security, and/or 2) the specific functional attributes associated with the assets, liabilities, inputs, outputs, products, or operations that are directly or indirectly associated with the security.

The aggregate expected return of a composite portfolio created using the methods described herein can be determined from the expected returns of each individual security and its weight in the composite portfolio. The aggregate expected volatility of the composite portfolio can be determined from the expected volatility and weight of individual investment securities and the pairwise correlations of these individual investment securities with one another. Because of this, the overall volatility can be controlled, and reduced, by stratification or segmentation of the portfolio into groups that have relatively high intra-group correlation and relatively lower inter-group correlation.

While quantitative values associated with securities are likely to exhibit significant astationarity, qualitative attributes are likely to persist over time, driving performance characteristics with consistency and facilitating portfolio management and index construction at scale. The data systems described herein, which enable the syntactic and functional tagging of hundreds of thousands of securities and the dynamic segmentation and stratification of large sets of securities by their associated attributes, are instrumental in enabling this process. As a non-limiting example, by dividing the securities into correlation clusters, i.e., groupings formed based on attributes that correspond to risks, volatility can be controlled.

Syntactic Attributes

The attributes described above can be represented in a syntax which defines the structure of the composite units and composite portfolios. The structures can be defined by the use of syntax and architectural positions or coordinates, including the identification of attributes related to data entities that are associated with syntactic positions. Syntactic tags can have relational attributes that enable syntactic positions to be related to each other.

As used herein, in some embodiments, a syntax may comprise a set of rules. A syntactic position can be defined as a valid position based on the set of rules. As a non-limiting example, a syntax may be represented in coordinate space in an arbitrary number of dimensions.

A symbol in a database corresponds to a data entity. In some embodiments, a syntactic tag associates a symbol and a rule, where the symbols are constituents of a lexicon, and the symbols can be combined to form valid expressions according to principles of the syntax. A syntactic tag associates the data entity marked by a symbol to the other data entities based on the syntax-established set of rules. In some embodiments, the process of syntactic tagging provides a means for relating domain-specific information. It takes information in a domain and tags it with rules that relate it in the domain. Syntactic tags can be dynamic.

In some embodiments, a syntax can be used to evaluate the validity of expressions in a system. A symbol in a database can be used to mark a data entity. A syntactic tag can be used to mark the association between a symbol and a mechanism for evaluating the validity of expressions. The tags may be of multiple types, including syntactic attribute tags which ascribe relationships between symbols and rules that characterize attributes. In some embodiments, a syntactic tag associates the data entity marked by a symbol to the other data entities based on the syntax-established set of principles. As a non-limiting example, this process of syntactic tagging provides a means for relating information within a domain or a subset thereof, or across domains.

Syntactic tags can have some or all of the following properties:

Expressions can be combinations of labels for tags. In some embodiments, such expressions can conform to a syntax expressible in BNF (Backus Normal Form or Backus-Naur Form) notation or an equivalent meta-notation.

Any valid expression or sub-expression consisting of more than one element of the syntax, can form a locus.

Any element of the syntax that has a range of potential values describes a dimension in a discrete multidimensional space consisting of the dimensions associated with all such elements.

Any expression or sub-expression of the syntax, containing elements which have a range of potential values, may be stratified, in which case that expression or sub-expression describes a dimension which consists of regions and successive sub-regions within the multi-dimensional space. As a default, elements of syntax which are designated as stratified are interpreted from left to right according to their position within the expression, as successive levels from top to bottom within the architecture.

Syntax can represent coordinates that provide successive specialization; the degree of specialization grows with the depth of the architecture. The syntax can also provide step-wise serialization at each level; the degree of serialization grows with the number of elements at each level.

In some embodiments, at each level of specialization and/or degree of serialization, the syntax elements share a proximate syntactic position with both:

a) their parent in the architecture; and b) their siblings in analogous positions across different architectures in the same syntax.

Syntax elements may be considered to have a proximate syntactic position if they are relatively close to other elements based on either their specialization or serial positions.

These relationships allow for comparison of values across syntactic positions. This property supports applications including but not limited to the complex structures, population sorting, autoclassification, and integration with prior art temporal and spatial classification systems.

A functional information system (FIS) can be implemented as a database system which utilizes syntactic tagging and the related concept of a locus, as a logical model for organizing data about a domain. A basic implementation of the FIS can be achieved by having a store of the syntactic terms of the FIS to augment the store of data entities in the domain. Each data entity can have a reference to its location in the FIS. These table references enable searching for all data-entities in a specific position as well as searching for the position of any data entity in the system.

Syntactic tags are assigned to structured or unstructured data, either manually or via an automated process and can be associated with a unique identifier for each data entity. When sets of data entities are associated with a bounded, well-known range of objects or entities, then a lexicon containing standardized identifiers may optionally be used to facilitate the assignment of identifiers to data entities.

As a non-limiting example, syntactic tags can be used to represent the syntactic components of a domain-specific data entity. They can be used for recording and storing information that indicates to a user how specific data entities relate to each other and/or to the specific domain. The tags can be used to determine which data entities are similar and/or why they are different and or to what degree they are different.

The domain-specific rules described herein can be used to characterize the syntactic components of data entities in a domain and populate sets of domain-specific syntactic tags. They can be assigned to any domain-specific data entity associated with a domain-specific syntactic position. Once assigned, stored and retrievable, the data entity can now be related with any other data entity that shares any value on its syntactic tag. It can be used for grouping of information based on, for example, broad values or very specific values. If the values are broad, it provides the ability to create ever-smaller sub-sets within the context of the broad set. If other domains share the same syntax, the tags can be used to compare data entities in one domain to data entities in other domains based on shared syntax.

The rules of syntax can be based on an arbitrary number of factors. As non-limiting examples, they could be based on common temporal order, spatial order, anatomical, morphological, physiological, or mechanical order. The rules could be areas specialized to a specific domain such as the order of its influences or of its origins. The rules could be experimental and the validity of the rules could be tested using syntactic tags. In each case, the knowledge influenced by some ordering principle has a syntax that provides the rules for the ordering. Once recorded, stored, and retrievable, the process of relating data entities based on syntactic tags can be based on established rules defining how different data entities relate. This system can be applied to any domain and any syntax. In so doing, it provides a tool to add dimensionality to information from any field. It can also provide a procedure for converting a legacy system from any field into this framework by applying syntactic tags to the legacy codes.

Syntactic positions in the system have specific attributes that are associated with the rules of the syntax. For example, if a domain-specific syntax is a temporally-based syntax, the attributes will be temporally related; if it is a spatially-based syntax the attributes will be spatially related; or, if the syntax is mechanically-based, the attributes will be mechanically related. If the syntax is sequential, the attributes will be sequentially related. If the syntax is nested, the attributes will be related to the rules of nesting.

In some embodiments, to create syntactic tags, a domain is defined, then a domain-specific syntax is defined. In one embodiment, the system can be configured so that the specific rules of the domain-specific syntax are fully represented in domain-specific syntactic tags.

Syntactic tagging links data entities with shared attributes by assigning each data entity to an element in the set of common syntactic tags. The syntactic tags associate data entities with the other data entities in a domain according to their syntactic associations. Thus, they inherently group and/or cluster all data entities that share syntactic tags.

In some embodiments, syntactic tags can be assigned to data entities which have one or more attributes in common, or the same or similar meaning, in a context of interest for the domain to which the FIS is applied. By tagging data entities with data-entity-type tags, the system can operate on multiple different kinds of data within a domain or data set. For example, data for products or markets can be added to company data. This function can be used in connection with flagging functions, described below, to indicate that certain tags may be required only for specific data-types.

Syntactic tags can be used to express:

(1) successive specialization, whereby all data entities that share the same tag at a higher level also share certain common characteristics or meanings within the domain; and the ordering of such labels within a level is a matter of tag assignment convention, or is arbitrary; and/or (2) a sequential process whereby all data entities that share the same tag at the next higher level also share the common characteristic that they are successive steps the same sequential process of the domain, at the same level of process-detail; and the ordering of such labels within the category directly reflects the sequence of steps.

In some embodiments, the complete enumeration of the valid syntactic tags provides a complete pre-existing model for the structures of interest in the domain to which the FIS model is applied, regardless of whether any data is actually tagged with any given label.

Syntactic tags for stratified composite units can be combined to form expressions. Such expressions can conform to a syntax expressible in BNF notation or an equivalent meta-notation. Any expression or sub-expression of the syntax, containing elements which have a range of potential values, may be stratified, in which case that expression or sub-expression describes a dimension which includes regions and successive sub-regions within the multi-dimensional space.

Syntactic elements may be considered to be proximate if they are relatively close to other elements based on either their symbolic representation or serial or complementary positions. These relationships allow for the comparison of values across syntactic positions.

Syntactic tagging of the attributes links data entities with shared attributes by assigning data entities to an element in the set of common syntactic tags. The syntactic tags associate data entities with the other data entities according to their syntactic associations. Thus, they may group or cluster data entities that share syntactic tags. In some cases, syntactic tags can be used to create a normative model for a portfolio, discussed in more detail below.

The systems described herein can be used in combination with a barcode that identifies a multitude of business attributes. The system can assign this standardized barcode with functional attributes and syntactic tags to securities in a portfolio. Based on this barcode of attributes, specific non-systematic risk exposures that exist in a portfolio can be identified. Once identified, the method can be used to control for these non-systematic risks by limiting a portfolio's exposure to these risks.

Figure 9:
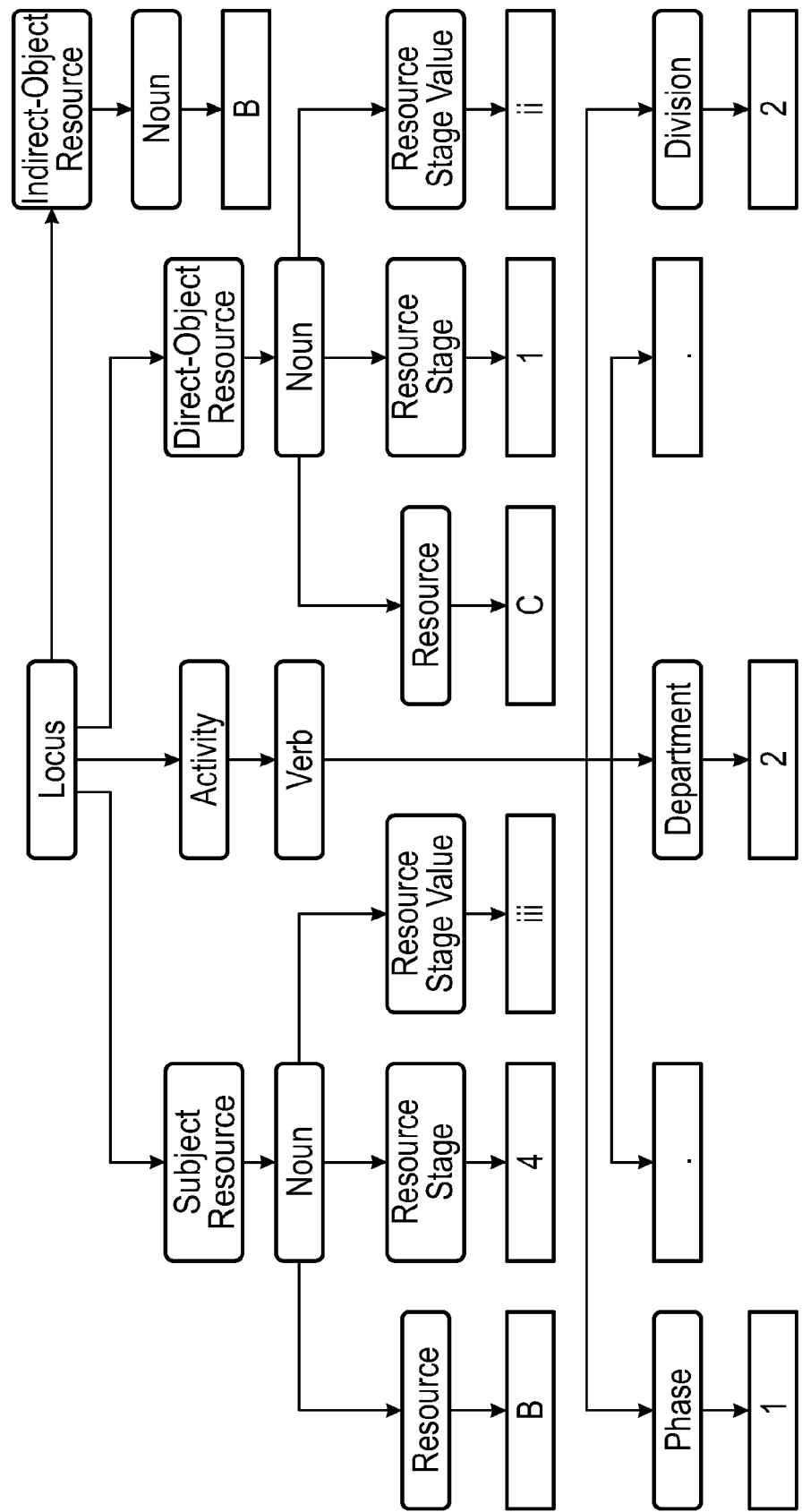
FIG. 9 illustrates example relationships between syntax elements graphically.

An example representation of an architecture developed from syntactic tags is illustrated in FIGS. 8A and 8B. A graphical representation is illustrated in FIG. 9.

Portfolio Architecture Creation

Constructing large-scale portfolios of securities is challenging for numerous reasons. It is difficult without both a reliable and validated system of attributes as well as a stratification or segmentation system that uses a stratified composite architecture or segmented composite units to control for the large number of functional attributes that influence performance at the security, group, and portfolio level. Independently and together, the systems and methods described herein enable the engineering and management of risk exposure on a large-scale basis.

An engineered composite of investment securities is a group of securities that are engineered (or selected) to possess a different risk/return profile than an uncontrolled grouping from the population of underlying securities or the underlying risk groupings that are used to construct the composite.

Stratified or segmented composite portfolios comprising investment securities can be based on a dynamic combination of entities of a proximate class to produce a new unit consisting of a part of each of the constituents being combined to create a new entity that has different properties from the underlying constituents taken separately. Dynamic properties mean that the properties of investment securities vary and change over time. Investment composites can be configured to account for this dynamic nature in order to create reliable composites that substantially maintain their properties over time.

A method for building a stratified composite portfolio using a syntax for investment securities can include the following steps: 1) grouping investment securities with common risk attributes; 2) stratifying or segmenting the grouped investment securities into sub-groups that are a) associated with different risks, while b) still associated with the risk characteristics of the group in which they are contained.

In one embodiment, a composite portfolio can include an identification of multiple securities and their associated weights. As a non-limiting example, the identifications and weights can be executed using a computerized process according to the example method illustrated in FIG. 1. As illustrated in FIG. 1, the method can first generate a stratified portfolio architecture (1125) and then a resultant list of investment securities and weights (1150). In an initial step, a stratification module (1105) can receive as inputs investment security-related attributes (1120) and an architecture of attribute rules (1122), both of which can be stored on one or more computerized data storage devices. As non-limiting examples, the investment security attributes can be selected from those examples provided above. Other attributes and types of attributes can be used.

The attribute rules can be provided by the portfolio architecture, as described above. The architecture can be used to define or evaluate relationships among attributes, tags, values, and the investment securities associated with the attributes.

The stratification module (1105) can also include a selection submodule (1110) to receive, as input, a selection from a user of attributes (1120). In some embodiments, the functional attributes characterizing the economic entities enables the construction of portfolios from securities associated with those entities. As a non-limiting example, a syntax permitting the evaluation of expressions characterizing economic entities is illustrated in FIGS. 8A-8B. In other embodiments, the syntax can be adapted to attributes selected by the user. In other embodiments, the user can be provided with an interface for creating new structures (1121) which are then inputted to the stratification module (1105).

In some embodiments, a structure can be created from a Boolean statement in the form of 'attribute' 'operator' 'value' that may return true or false for an entity or its associated investment security based on its attributes. In other embodiments, a structure can be created a Boolean expression that combines (via Boolean operators) one or more statements. The lines in FIG. 9 illustrate examples.

In some embodiments, a architecture can be defined as a relationship among a set of structures that defines the portfolio segments, under the constraint that any entity or its investment security that fails at one node in the structures will not be passed through the rules of any of that parent's children. The stratification submodule (1115) can be configured to create a stratified portfolio architecture (1125) based on the set of structures (1122), investment security attributes (1120) (optional at this stage), input regarding the creation and selection of structures (1121), or a listing or other identification of investment securities (1131). The stratified portfolio architecture (1125) can then be electronically represented and stored on a computerized data storage device.

A structure can be derived from one or more statements that filter entities and investment securities based on attributes. As a non-limiting example, a stratified structure can be used to define a relationship among structures. Any company that is excluded from a top level will also be excluded from lower groups. The multiple attribute system described herein can be configured by varying the population in any parent or child by varying one (or more) of the attributes defining that parent or child. The ordered rules can also be expressed as a graph or network, which can be configured by enabling the population to be dynamically ordered based on functional attributes defined by the computerized system, the user, or a combination thereof.

Example graphical and textual representations of a resultant stratified portfolio architecture are illustrated in FIGS. 3 and 4. FIG. 3 illustrates example attributes and their syntax. The attribute-based rules illustrated in FIG. 3 are graphically presented in FIG. 4. The rules illustrated in FIG. 3 describe a top level composed of two groups having enterprise loci of real estate (1; 1205) and equipment materials manufacturers (2; 1210). The rules in FIG. 3 further describe enterprise loci of real estate developers (1.A; 1215), real estate operators (1.B; 1220), REITs/real estate lessors (1.C; 1225), manufacturers of materials for information-processing equipment (2.A; 1230), and manufacturers of materials for non-information-processing equipment (2.B; 1235). These enterprise loci are illustrated at level two of the stratified architecture. The rules in FIG. 4 include several third-level relationships. The third-level defines relationships for consumer real estate developers (1.A.i; 1240), industrial real estate developers (1.A.ii; 1245) under real estate developers (1.A; 1215); North American real estate operators (1.B.i; 1250), European real estate operators (1.B.i; 1255), and Asian real estate operators (1.B.i; 1260) under real estate operators (1.B; 1220); and low-leverage REITs (1.C.i; 1265) and leveraged REITs (1.C.ii; 1270) under REITs/real estate lessors (1.C;

1225). Further relationships are illustrated under groups (2.A; 1230) and (2.B; 1235), but are not further described here.

Numerous attributes may be used to create a portfolio architecture. The portfolio architecture can include a nested structure of groups. As a non-limiting example, in some instances, these groups can be formed by referencing the attributes which are common to all entities in the universe, such that at each level, every element of the universe is in exactly one group. In some embodiments, these groups may be sub-divided into an arbitrary number of child sub-groups—and this number need not be the same for each of the original parent groups—and this sub-division process can be carried out an arbitrary number of times, each time adding a level to the architecture in a "top-down" manner. In some embodiments, stratified composite units are used to build larger stratified composite units, creating a structure in a "bottom-up" manner. In some embodiments, a combination of "top-down" and "bottom-up" approaches may be used. In other embodiments, existing economic and financial classification schemes may reconfigured using syntactic tagging to make them relational and dynamic, and be partially or wholly used in the portfolio architecture in combination with any or all of the universe selection, weighting, reweighting, and rebalancing schemes described herein. Regardless of the construction method, the resultant portfolio architecture (1125) can comprise an electronic representation of a set of attributes arranged, as non-limiting examples, in graphical, segmented, stratified, or network form, according to the defined attribute rules.

Weighting of Investment Securities

A stratified or segmented composite portfolio can be constructed of one or more stratified or segmented composites that maintain defined risk exposures by weighting the constituents of the stratified or segmented portfolio accordingly.

The stratification or segmentation described herein can be adjusted in various ways to enable a user to control the population of investment securities and thus the outcomes that arise from events associated with a population of investment securities. Portfolios can be adjusted, and resulting performance metrics can be engineered, based on changes made to any or all of: 1) the population of investment securities; 2) how the population of investment securities is stratified or segmented (the portfolio architecture); and, 3) how the stratification or segmented units are weighted within the architecture, graph, or network.

Once the portfolio architecture has been determined, weights can be determined for the securities. As a non-limiting example, a weighting function can be any function that, for a specific group in a stratified portfolio architecture, returns a value between −1 and 1 indicating the weight associated with that group relative to its siblings in the portfolio architecture. In some embodiments, the absolute value of a weight may exceed 1. As non-limiting examples, negative weights can be implemented by short selling, and weights whose absolute value exceeds 1 can be facilitated through leverage. In some embodiments, the sum of the weighting function for all the siblings or composites at each level or unit can be equal to 1.

In some embodiments, a security's weight is only a function of its position in the architecture. As a non-limiting example, among strata, weights may be divided evenly between all of the children of a given parent group. That is, if the first level contained 10 groups, each would be given a weight of 10%. If one of these groups contained 4 sub-groups, each would be given a weight 25% of its parent group, for a resultant weight of 25%*10%=2.5%; while if a different top-level group had 5 child groups, each child would weigh 20%*10%=2%. This process can be repeated for each level, eventually yielding a weight for each bottom-level group. A similar process can be applied to securities within each bottom-level group, yielding weights for each security in the universe.

In some embodiments, the weighting algorithm can be executed by a computer, as follows:

```
class PortfolioGroup
    # Returns a list of the portfolio groups
    # at the same level as this portfolio group
    def siblings
        ...
    end
    # returns a parent of this portfolio group.
    # if this portfolio group does not have a
    # parent, it returns undefined.
    def parent
        ...
    end
    # returns the weight that should be associated
    # with this portfolio group.
    def weight
        num_of_siblings = self.siblings.count
        if parent.is_defined?
            parent_weight = self.parent.weight
        else
            parent_weight = 100
        end
        return 1/num_of_siblings * parent_weight
    end
end
```

In other embodiments, the weight of any group may be derived from the incidence attributes of the companies in that group. As a non-limiting example, groups (formed using any of the attributes) may be weighted by a function of one or more of the attributes common to securities in the universe. As a non-limiting example, groups may be weighted within their parent group proportional to the total debt of all securities in the group. In some embodiments, the function depends on a single attribute. In other embodiments, the function depends on a plurality of attributes. In some embodiments, the same function is used to weight every group in the architecture. In other embodiments, different functions may be used to weight different groups in the architecture. In some embodiments, the weighting can be executed by a computer, as follows:

```
class PortfolioGroup
    # Returns a list of the portfolio groups
    # at the same level as this portfolio group
    def siblings
        ...
    end
    # returns a parent of this portfolio group.
    # if this portfolio group does not have a
    # parent, it returns undefined.
    def parent
        ...
    end
    # A function that for a specific group in
    # a stratified portfolio architecture returns
    # a value between 0 and 1 indicating the weight
    # associated with that group relative to its
    # siblings in the portfolio architecture.
    #
    # The sum of the weighting function for the
    # siblings at each level equals 1.
    def weighting
```

```
        ...
      end
      # returns the weight that should be associated
      # with this portfolio group.
      def weight( )
        if parent.is_defined?
          parent_weight = self.parent.weight
        else
          parent_weight = 100
        end
        return weighting * parent_weight
      end
    end
```

Figure 2:
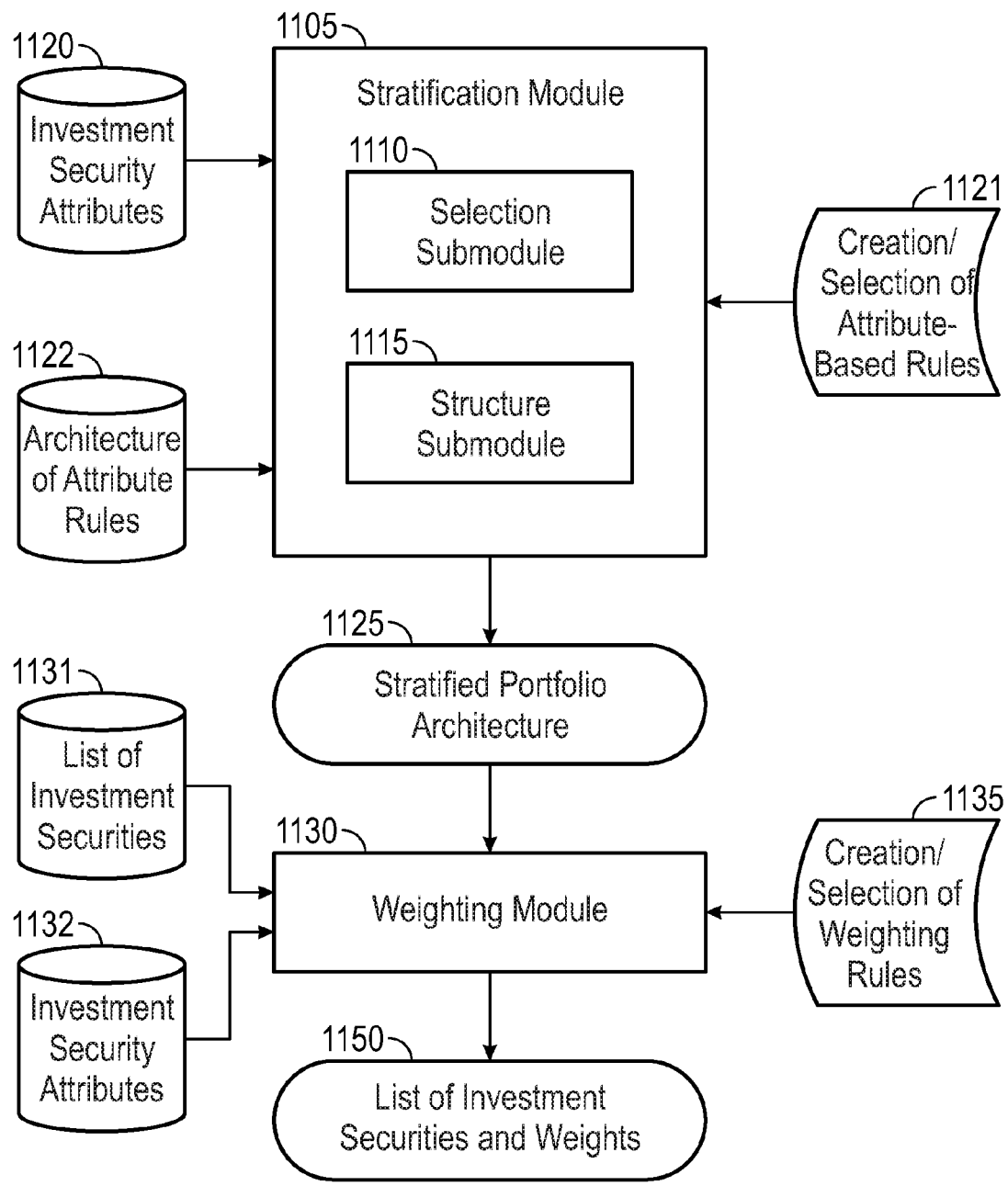
FIG. 2 illustrates an example method for creating a stratified composite portfolio and weighting investment securities.
Figure 6:
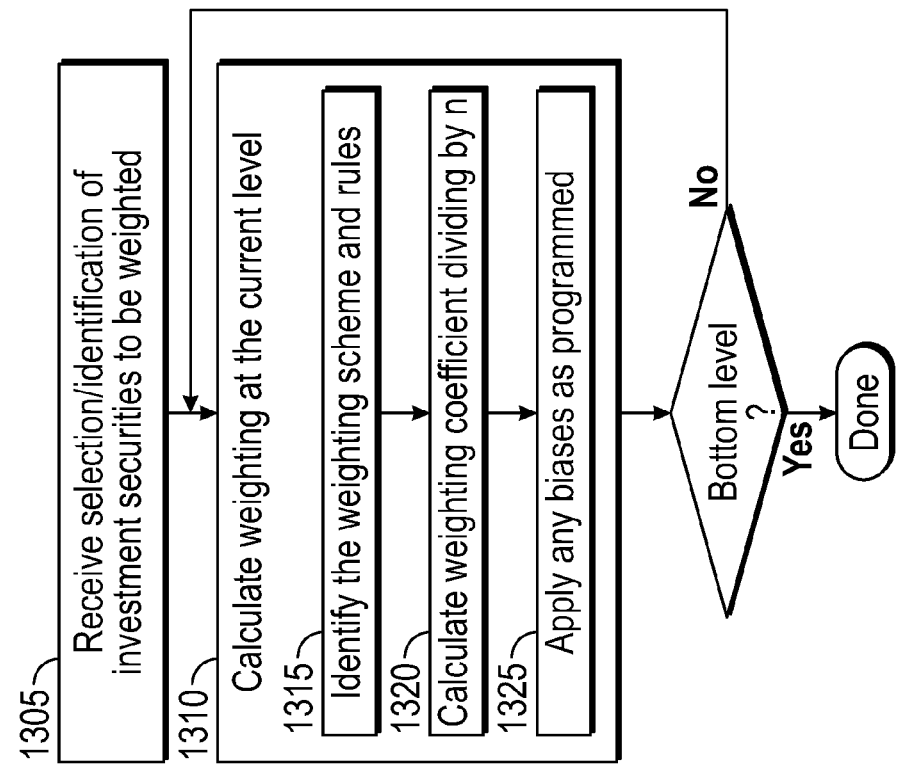
FIG. 6 illustrates an example method for calculating weightings for a stratified composite portfolio.

With reference to the example of FIG. 1, computerized weighting module (1130) receives the portfolio architecture (1125). As illustrated in FIG. 2, the weighting module can also be configured to receive identification of investment securities (1131), and identification of attributes (1132) associated with the securities. The weighting module can then generate a list of securities and associated weights (1150). The weighting module is illustrated in further detail in FIG. 6. As illustrated in FIG. 6, the system can receive a selection and/or identification of the investment securities to be weighted (1305). The investment securities to be weighted could be positioned at any point or points in the architecture described above. Weightings for individual securities and groups of securities can then be calculated for the current level or segment (1310). In some embodiments, the calculation can start at the top stratum. At the current level, the weighting scheme and rules (1315) for that level are identified. A weighting coefficient can be calculated by dividing the outstanding proportion of weight by n, the number of investment securities or groups of securities (1320). As a non-limiting example, with reference to FIG. 4, the top-level weighting may be calculated to be 50% to Group 1 and 50% to Group 2. At the second level, Groups 1A-1C may be weighted at 0.50*0.333=0.167 or 16.7% each.

Before or after calculation of the weightings, any positive or negative weighting biases may be applied (1325). Biases can be applied by arithmetic or other operations on the weightings. In some embodiments, any biases that are applied to one group or investment security require a corresponding opposite bias to be applied elsewhere in the same group or in a peer group at the same level. If the bottom level has been reached and completed, the weighting process may terminate. Otherwise, the process may continue at the next level.

The electronic representation of the weighted investment securities can then be input as instructions to, as non-limiting examples, an exchange traded fund (ETF) or another financial instrument such as a hedge fund, mutual fund, limited partnership or another investment vehicle.

In alternative embodiments, the steps of the method for stratification, segmentation, and weighting can be reordered. For example, the list of investment securities could be introduced anywhere in the portfolio engineering process. Investment securities and/or a reconstitution process could be chosen before stratification or segmentation to create exposure to a particular universe. An architecture, weighting scheme, or rebalancing scheme could be selected or chosen before or after choosing the investment securities.

Alternative orderings and variations of the steps for creating the portfolio of investment securities described above are possible. For example, with reference to FIG. 1, the identification of investment securities (1131) can be provided to the stratification module (1105). In that arrangement, the stratification submodule can generate the stratified portfolio architecture of investment securities (1125) that is then input to weighting module (1130).

In some embodiments, universe identification, group selection, and performance characteristics can be combined into one module. In other embodiments, frames representing queries, structures, and outputs can be combined into one module. The portfolio and its constituent groups, composites, and/or securities may be represented, as non-limiting examples, in stratified, segmented, networked, or graphical format, or in a daisy chart. In some embodiments, the outputs may be selected from a chart, geographic map, tree map, microarray, or table.

Reconstituting and Re-Weighting

Figure 5:
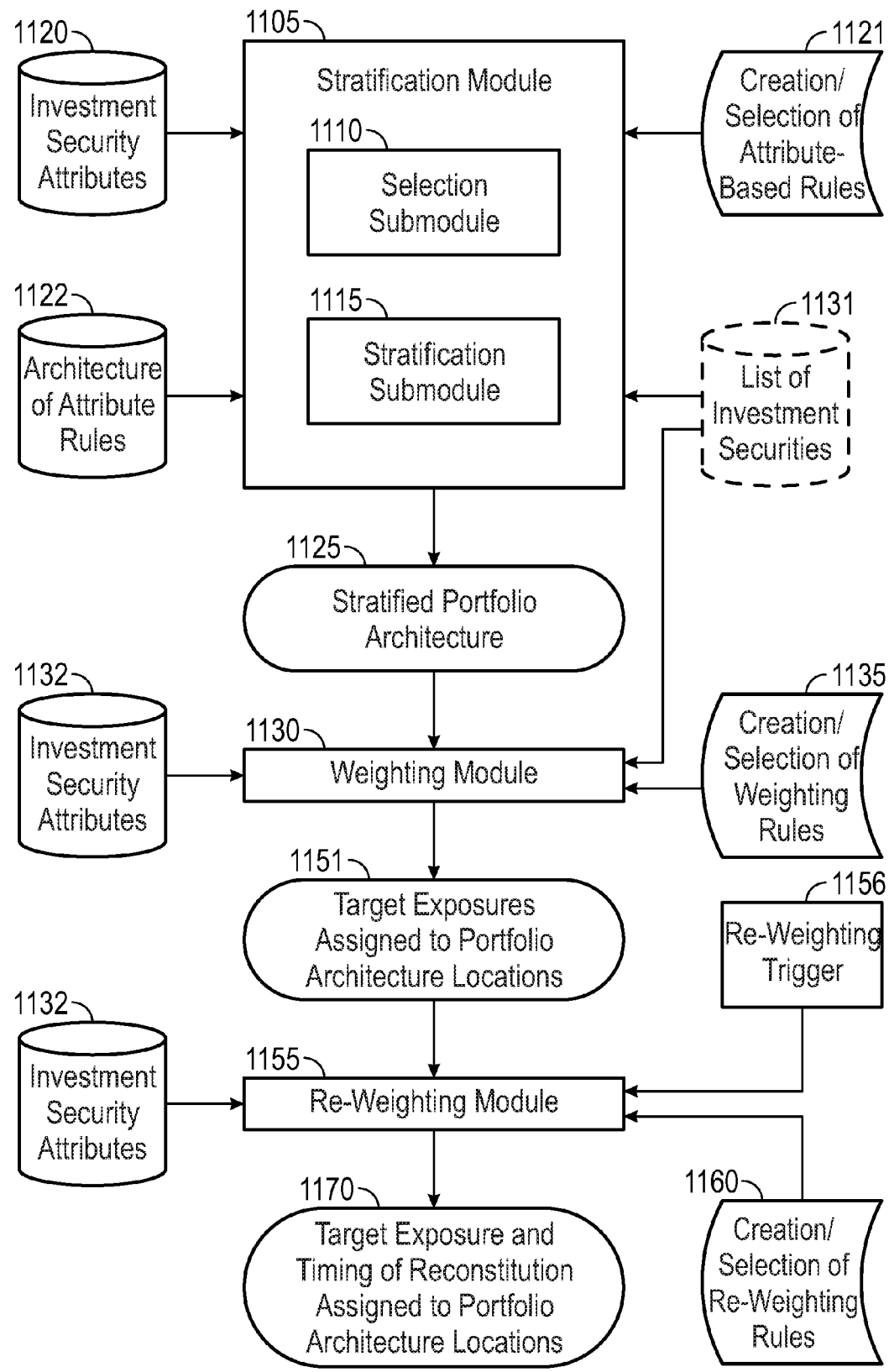
FIG. 5 illustrates an example method for creating a stratified composite portfolio and weighting investment securities.

Additionally, some embodiments can include reconstituting the designated segment or group weights on a periodic basis to maintain the desired risk exposures. A stratified or segmented portfolio can be comprised of one or more stratified or segmented composite units, respectively, that maintain defined risk exposures by weighting the constituents accordingly and reconstituting the designated weights on a periodic basis to maintain the desired risk exposures. With reference to the embodiments illustrated in FIGS. 1, 2 and 5, the steps illustrated can be performed at any arbitrary point to create a re-weighted portfolio based on modified inputs, such as modified weighting rules. With reference to FIG. 5, in other embodiments, the re-weighting can be provided by a separate re-weighting module (1155). The re-weighting module (1155) receives a list of target exposures assigned to portfolio groups, composites, or constituents (1151). The re-weighting module then selects new investment securities for inclusion in the stratified composite portfolio.

Composite Portfolio Scoring

Using methods described herein, a score can be calculated for a composite portfolio. The score can be a characteristic of the portfolio and can be used in multiple contexts. In some embodiments, the target score can be a number that the portfolio is engineered to reach. In other embodiments, the target score can be a set of attributes that an investor would like the portfolio to have. The portfolio score can be a value or vector of values calculated from the portfolio which can be compared with a target score an investor has for the portfolio. The target score can be a theoretical or estimated value.

A target score can be used as a way to optimize a portfolio. The investor can pick the target score and the system can then be used to build a stratified composite portfolio optimized for that score. Alternatively, a target score can be used to build a portfolio that reflects the performance of the underlying population. That is, the target score can measure expected population performance, and the stratified or segmented composite can be used to measure actual population performance. Given a weighted list of securities of a portfolio and a target score, the score for the portfolio may be calculated based on derived attributes of a portfolio.

The target score can represent an estimate of expected or targeted portfolio performance. The target score can be achieved by measuring the performance of, as non-limiting examples, individual companies, randomly sampled individual companies, stratification units, segments, and/or composites.

The target score can also be identified as the target score that the investor seeks as part of the investment objective. Here, the investor may want to use a stratified or segmented composite to reach a predetermined target score. By building groups based on common attributes, risk groups can be formed. These risk groups may then be weighted appropriately to achieve the target score, resulting in a portfolio with known biases.

In some embodiments, a stratified or segmented composite portfolio may be engineered to meet a user-defined target score. As non-limiting examples, a target score could include any or all of: (a) absolute return goals (e.g., expected rolling rates), (b) risk/return measure (e.g., Sharpe ratio, Sortino ratio, or alpha), or (c) risk goal as measured by volatility (e.g., downside deviation or beta). In some embodiments, a target score may be a one- or multi-dimensional vector of values or elements, such as those examples provided above. As a non-limiting example, the target score could be [the actual return–the risk free rate]/[the expected return–the risk free rate] where the target score is greater than or equal to one.

Figure 7:
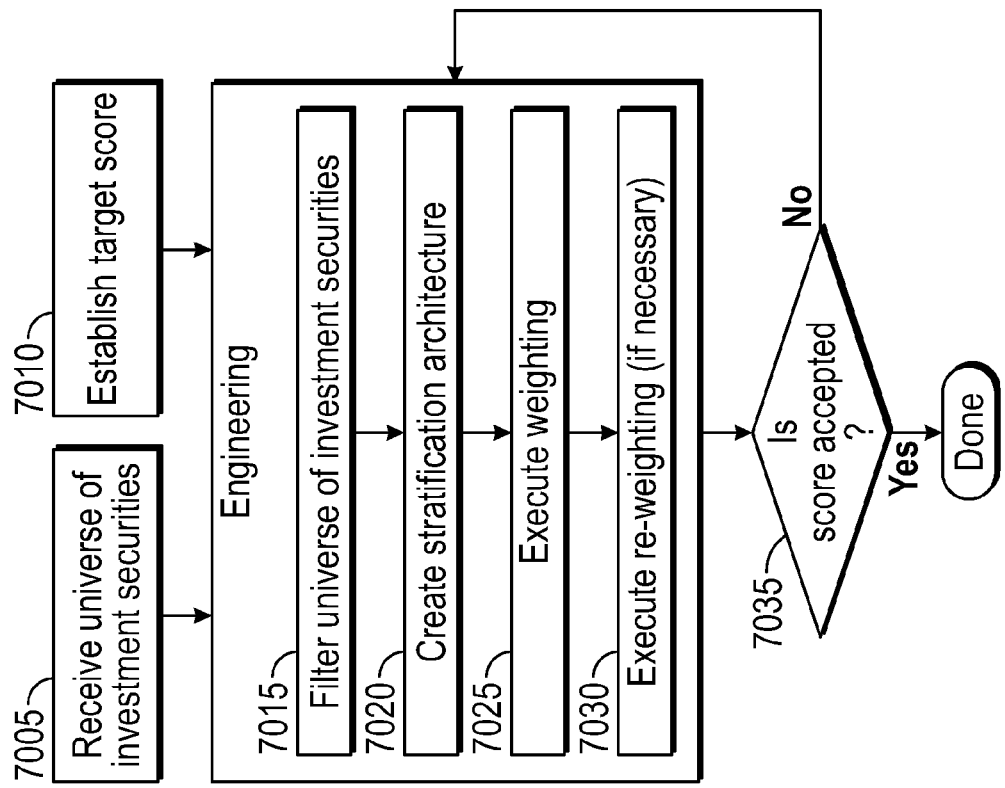
FIG. 7 illustrates an example method for creating a stratified composite portfolio with a target score.

A method for constructing a stratified composite with a target score, according to one embodiment, is described below with reference to FIG. 7. As an initial step, the user establishes a population in which to invest by identifying a universe of investment securities (7005). The population could be, for example, financial and energy companies in the U.S. Next, the universe of securities is filtered (7015). The population of companies is then stratified (7020). By this process, they are placed into stratification units, or groupings based on common functional or syntactic tags, values, or attributes.

After population stratification or segmentation, the metrics are identified that will be used to evaluate the portfolio. The metrics used can depend on the population that is being stratified. For example, the metrics used for an investment-grade debt portfolio may be expected yield and volatility, while the metrics of an equity portfolio may be expected risk and return. Once the metrics have been identified, a target score can be established (7010). The target score is the goal that the user would like to see the portfolio achieve, the goal being measured by the identified metrics. For example, the target score of an investment grade debt portfolio can be an expected yield and expected volatility that an investor would like the portfolio to achieve. Example embodiments of the target score are described below.

Once the target score is set, an engineered composite portfolio can be created (7020). Composites can be combinations of two or more stratification units which can be engineered to reach the target score. Composites can be engineered by strategically weighting stratification units and the companies within the stratification units (7025) and reweighting the constituent companies (7030). The weighting and re-weighting process can include changing the population's constituents (adding or deleting constituents from the portfolio that meet the population criteria).

The composite can be tested against the target score (7035). If the target score is accepted, the process can reach completion. If the target score is not satisfied, then some or all of various parameters can be adjusted, including 1) the architecture rules, 2) the weighting rules, 3) the universe filtered through the structure and weighted, and 4) the rebalancing/reconstitution policies. The process can be repeated until a portfolio with a satisfactory score is created.

A stratified composite can be used to optimize a portfolio. As described above, an engineered composite can be constructed to meet a target score. Here, the target score can be considered the investment objective. For example, the objective could be to build a composite whose return, performance, variance, or other property, quality, or characteristic matches what is outlined in the target score.

Therefore, instead of building a portfolio that is most representative of the underlying population, a portfolio can be created that strategically weights the lower-level groupings so that the portfolio will match most closely its target score. Here, stratifying or segmenting the portfolio and building composites enable the identification of risk groups within a population. Weights thus can be strategically allocated across them in order to meet the target score.

In investment securities, the primary concerns for investors are risk, expected return, and liquidity. Therefore, in some embodiments, the target score may reflect the investment objectives of the portfolio quantified with respect to the portfolio's risk, expected return, and liquidity characteristics. The goal in creating investment composites is to engineer the risk, return, and liquidity through composite design and weighting of the underlying constituents. The engineered investment composites can produce composite scores (calculated from combining individual security data impacted by multiple attributes) that reliably can achieve theoretical estimates.

Using the methods described herein, composites can be engineered to improve upon these functional properties, which can be identified or designed for use in specific environments. In categorizing investment securities, composites can be formed to manage composite scores. A stratified or segmented composite can be used to achieve a target score. Stratification or segmentation allows identified risks to be grouped within a portfolio. Therefore, when creating an engineered portfolio that meets a target score, risks to which the portfolio will be exposed can be better understood qualitatively and quantitatively.

Synthetic Conglomerates

The methods described herein may be used, as a non-limiting example, as a means to achieve through functional diversification a targeted point on the portfolio risk-return-liquidity frontier. The data systems described herein enable the synthesis of instruments that achieve the diversification at scale sought by conglomerate managers, holding companies, or investors in private equity firms, without incurring the high transaction costs associated with private market transactions or significant operating expenses. In some embodiments, a synthetic conglomerate is an engineered composite, that, as a non-limiting example, can be configured to achieve a certain target score.

As a non-limiting example, the management of the synthetic conglomerate can be effectuated in real-time by the data systems described herein, by permitting the dynamic aggregation of the financial statements of each of the constituents of large portfolios and the calculation and display of their consolidated balance sheets, income statements, and cash flow statements. The technologies described herein permit customized identification and selection of exposures within large-scale portfolios across functional, temporal, and geographic space.

In some embodiments, the preparation of earnings estimates and projected financial statements at the portfolio, engineered composite, or synthetic conglomerate level permit the establishment of a trackable internal benchmark. This customized portfolio, engineered composite, or synthetic conglomerate can be compared to those earnings estimates or financial statements to determine whether they met or exceeded projections. As a result, the customized portfolio, engineered composite, or synthetic conglomerate can be compared reliably to internal projections rather than relying, as other portfolios and indices are required to do, on external benchmarks.

In some embodiments, the data systems described herein enable the creation of streams of earnings, dividends, and cash flows at the portfolio level that are more stable, consistent, and predictable than those at the group level. In other embodiments, the streams at the group level will be more stable, consistent, and predictable than those at the security level. In other embodiments, the streams at the portfolio level will be more stable, consistent, and predictable than those at the security level. In some embodiments, the engineered composite or synthetic conglomerate can be considered a benchmark that delivers more consistent, stable, and predictable returns that more reliably attain the rates of risk and liquidity-adjusted return predicted by financial theory than other commercially available or widely held indices or benchmarks.

Portfolio Graph

A graph of a heterogeneous population of securities and their associated functional attributes, tags, and/or values may be constructed based on an underlying functional syntax in conjunction with semantic tags and attributes, geographical and temporal data, and associated measures and metrics. As a non-limiting example, a graph of data entities representing a population of investment securities or financial instruments is described below.

The investment securities or financial instruments are assigned nodes on the graph; as non-limiting examples, the data entities may correspond to historical or current companies, sectors, products, securities, investments, loans, or components, aggregations, inputs, or outputs thereof.

The nodes are connected based on the relationships (demarcated by edges) between the underlying economic entities, including, but not limited to, those codified in the functional syntax, geographic or temporal relationships, or those derived from proximate economic relationships in the referent system, including supplier-business, intermediary-seller, work group-department, sector-industry. In some embodiments, the graph is a directed graph.

The nodes can be grouped visually based on proximity relationships derived from the functional syntax, the semantic tags and attributes, and associated measures and metrics. As non-limiting examples, the relationships may be ordered and represented through spectral analysis, eigenvector clustering, and k-means clustering.

In some embodiments, the edges may be weighted or colored based on the extent of interdependence among the nodes or the categorical relationships they reflect; as non-limiting examples, this may be derived from trade, transaction, investment, or financing data among the entities and their economic referents, commonality of semantic tags or attributes, proximity of geographic or temporal relationships, or from the underlying functional syntax.

In some embodiments, the nodes may be weighted or colored based on the size or scale of the entity, or any of the categories associated with the referent data; as non-limiting examples, this may be derived from trade, transaction, investment, financing, or other capital markets or accounting-based data associated with the entity, semantic, syntactic, or functional tags or attributes associated with the entity, geographic or temporal data associated with the entity, or measures and metrics associated with any of the foregoing.

The visual representation of the graph and its component parts may be derived from default preferences specified by the system, preferences expressed by one or more users, or a combination thereof.

The graph may be updated dynamically to reflect changes in the relationships among entities, permitting an visual representation of an evolutionary model for a portfolio.

Portfolio Fields

The model of the system may be represented, as a non-limiting example, as a field on which mathematical operations can be performed, which facilitates the study of the interactions among the economic entities or the issuers of the investment securities.

In some embodiments, a set of economic entities E and a structure on that set S, comprised of subsets $s_{1, 2 \ldots n}$ of those economic entities, may be stored. In some embodiments, the structure is an element of the power set of E, P(E). A set of attributes $A=\{\alpha_{1, 2 \ldots n}\}$ may be mapped to those subsets, based on the set a set of values $V=\{v_{1, 2 \ldots n}\}$, such that each each $\alpha \epsilon A$ is a mapping $\alpha: S \rightarrow V_\alpha$. In other embodiments, the entities may be non-economic.

In some embodiments, the field will be an ordered tuple (E, S, A). In other embodiments, the field will be an ordered tuple (E, S, A, V). In other embodiments, the field will not be ordered. In some embodiments, the entities can be combined to form expressions, or ordered sets which can be evaluated by a syntax. In other embodiments, the expressions will be one or more combinations of entities which lack order, or which cannot be evaluated by a syntax. In some embodiments, a portfolio, group, sub-group, stratum, or segment may be characterized as a field.

As non-limiting examples, the model of the system characterized by the field may be syntactic, semantic, visual, qualitative, or quantitative, or some combination thereof. As non-limiting examples, the field may be represented graphically, hierarchically, or in clustered or networked form. In some embodiments, the representation will satisfy the formal mathematical properties of a field. In other embodiments, the representation will not satisfy the formal mathematical properties of a field.

Investment Returns for Securities

In some embodiments, for any given security s, its return r over a time period t can be described as $$k\iiint f_j(a)dwda dt + \int n_m(t)dt$$

where $\alpha_{1, 2 \ldots n}$ are the attributes in a given time period that influence the return of the security, $w_{1, 2 \ldots n}$ are the weights to be assigned to each of those attributes, k is a constant, and n is a set of equations modeling stochastic components.

In some embodiments, the model can be used in conjunction with the mathematical field representation to map the effects of the attributes on performance characteristics across groups of securities. In other embodiments, this return formula can be used for predictive modeling, diagnostics, or recommendations. In some embodiments, $$\int n_m(t)dt$$

will be 0; in other embodiments, it will be nonzero.

Investment Statistics for Stratified Composite Portfolios

A portfolio generated according to the methods described herein can be scored using modified versions of known statistical indicators, including, as non-limiting examples, alpha, beta, and Sharpe and Sortino ratios. A score can be generated based on a normative stratified or composite model portfolio and variations on the normative portfolio. For example, a stratified or segmented alpha can be calculated as a risk-adjusted premium to a score on normative portfolio. A stratified or segmented beta with respect to a normalized market can also be calculated for a stratified or segmented portfolio where the normalized market is defined to have a beta of 1.

In some embodiments, normative stratified or segmented betas can be calculated with respect to any market portfolio, e.g., as non-limiting examples, stratified or segmented composite portfolios of the total market, or a subset thereof. For example, the contextual subset could be defined, as non-limiting examples, as a sector, industry, geographic region, time period, dictionary term, or thesaurus term.

Financial Recommendation Engine

The method described herein can be used to recommend securities, composites, and portfolios to users. These recommendations are derived from the securities and their referent economic entities' syntactic and empirical relationships; the functional, syntactic, semantic, temporal, geographic, financial, or economic tags, attributes, and values assigned to the economic entities; the express and revealed preferences of the users of the database or software; and the relationships of the users in the network.

The relationships embodied in the syntactic tags, attributes, and values assigned to the economic entities enable, as a non-limiting example, an initial default calculation of proximity among them. In some embodiments, entities sharing common or proximate values or attributes associated with a plurality of tags, loci, or partial or full sequences thereof may be proximate within one or more databases used to provide recommendations, while entities with a plurality of disparate or divergent values or attributes associated with a plurality of tags, loci, or partial or full sequences thereof may be disparate within those databases.

Proximity may also be derived from the empirical relationships among the securities and economic entities, which can be aggregated, stored, and assigned to the data entities and their referents. In some embodiments, these may include [supplier-customer], [investor-entrepreneur], [impact investor-social enterprise], [intermediary-customer], [customer-customer of customer], [lender-borrower], [input-output], [employer-employee], [company-department], [general partner-limited partner], [service provider-client], [department-work group], [subject-activity-direct object-indirect object], [parent company-subsidiary], [raw material-basic component], [basic component-complex component], or [complex component-final product].

These empirical relationships may be weighted, scored, timestamped, or geotagged, and stored in one or more databases as a basis for proximity calculations. In some embodiments, economic entities sharing numerous recent or heavily weighted relationships with one another, or with a common third party, will be proximate within one or more databases used to provide recommendations, while economic entities without common relationships, or whose relationships are purely historical, will be distant within those databases.

Proximity relationships may also be derived from the non-syntactic proprietary tags, attributes, and values assigned to the economic entities and securities; as non-limiting examples, these tags may be functional or semantic. In some embodiments, these tags, attributes, and values may include [raw material], [basic component], [complex component], [final product], [information output], [intermediary], [department], [work group], [customer], [co-customer], [customer of customer], [procurement], [transportation], [storage], [design], [production], [quality control], [sales], [exchange], [banking], [investment design], [management [audit], [capital], [energy], [information], [land], [tools], or [labor].

In addition, proximity relationships may be derived from the non-proprietary, commonly available tags, attributes, and values assigned to the economic entities. As non-limiting examples, these tags, attributes, and values may include [asset class], [exchange listing], [yield], [duration], [convexity], [date founded], [location of headquarters], [location of incorporation], [market capitalization], [revenue], [expenses], [net income], [cash flow from operations], [cash flow from financing], or [cash flow from investing].

These tags, attributes, and values may be weighted, score, timestamped, or geotagged, and stored in one or more databases as a basis for proximity calculations. In some embodiments, economic entities or securities currently sharing numerous identical or similar tags, attributes, and values will be proximate within one or more databases used to provide recommendations, while economic entities with few common tags will be distant within those databases.

The relationships, tags, attributes, and/or values, derived from one or more databases of securities and economic entities, permit a default calculation of proximity to a user. User preferences, current user holdings, and network position facilitate the customization of financial recommendations to users based on dynamic proximity calculations.

In some embodiments, users may input their express preferences, whether syntactic, functional, non-syntactic, non-functional, or some combination thereof, and associated values into the system upon registering to gain access to the database. In other embodiments, these preferences, or filters, may be inputted or modified at any time, either through a separate module or by indicating a preference for or against data entities associated with securities and economic entities. The filters may be absolute, in that they will permit the user to exclude or include certain relationships, attributes, tags, or values, or they may be relative, in that they enable the user to indicate the extent of a preference for or against certain relationships, attributes, tags, or values.

As non-limiting examples, these filters may enable the user to express absolute or relative preferences for [market capitalization], [asset class], [asset allocation], [funds], [expected return], [risk], [geography], [supplier], [investor], [customer], [lender-borrower], [issuer-investor], [1.1], [1.2], [1.3], [2.1], [2.2], [2.3], [3.1], [3.2], [3.3], [4.1], [4.2], [4.3], [0.1], [0.2], [0.3], [A], [B], [C], [D], [E], [F], [1i], [1ii], [1iii], [2i], [2ii], [2iii], [3i], [3ii], [3iii], [4i], [4ii], [4iii], [portfolio], [composite], [stratified structure], or one or more of any of the other relationships, tags, attributes, or values assigned to the securities and economic entities.

Users may also reveal their preferences through their interactions with the data entities on the system. In some embodiments, preferences will be revealed by tracking user accounts, monitoring clicks, screen time, portfolio construction, and/or transactions executed, and using a machine learning process to improve dynamically the customized recommendations to a user based on their preferences. In some embodiments, users may upload their portfolios to the system, whose constituents also may be used to guide customized recommendations.

Network position may facilitate proximity calculations and dynamic, customized recommendations. The system may track connections among users and the extent of their interactions. In some embodiments, strong connections among users on the system will lead their recommendations to converge significantly, weak connections will lead the recommendations to converge slightly, and numerous degrees of separation will lead the recommendations to diverge.

In some embodiments, similarities among users in the system may lead the recommendations provided to them to converge, while differences among the users may lead those recommendations to diverge. As a non-limiting example, the system may use machine learning techniques to improve dynamically the quality of customized recommendations based on changes in the network of users, their preferences, or the tags, attributes, values, or relationships assigned to the securities or economic entities.

Data Analytics

The systems syntax described herein is well-suited to organize and analyze very large data sets associated with domains that can be effectively studied through functional models, including, as non-limiting examples, biology, physics, ecology, economics, computer science, genomics, bioinformatics, aeronautics, telecommunications, electrodynamics, astronautics, finance, investment management, healthcare, medicine, epidemiology, chemistry, geology, transportation, engineering, legal systems, regulatory systems, legislative systems, political systems, and economic development. As non-limiting examples, data sets characterizing these complex systems may be hundreds of terabytes or petabytes in size, have hundreds of thousands or millions of elements, and have thousands of variables that significantly impact the characteristics or features of the system. The analysis of these complex systems is impracticable without an underlying functional model and advanced customized data systems.

The assignment of tags, metatags, attributes, and values derived from an underlying relational model of activities and resources in complex systems facilitates the development of real-time tools to enable diagnostics, customized recommendations, and predictive analytics, thereby permitting dynamic responses to rapidly changing events. These real-time tools may be particularly critical during periods in which the system is chaotic or far from equilibrium; as non-limiting examples, these may include perturbations, shocks, natural disasters, bubbles, panics, manias, or crashes, periods during which mechanical models of systems and standard database tools are likely to prove ineffective or even harmful. As non-limiting examples, the tags, metatags, or attributes may be syntactic, semantic, morpho-syntatic, morphological, physiological, anatomical, geographic, temporal, or demographic. In some embodiments, the assignment or identification of one or more tags, attributes, or values, or the proximity or similarity of tags, attributes, or values, may facilitate the assignment, identification, prediction, or recommendation of one or more other tags, attributes, or values. In other embodiments, the application of graph structures or network models facilitates the development of these analytical tools.

Normative Cases for Stratified Portfolios

Using the systems and methods described herein, a normative stratified or segmented portfolio can be defined. Stratified or segmented units can be used as a tool for building normative models and developing normative target scores. Reliable and validated categories of investment securities can be used to sub-divide populations of securities to validate normative studies. The user can develop normative scores to test a hypothesis and validate a baseline for use in the comparative study of other stratified or segmented portfolios. The system can be configured so that a normative stratified portfolio can be used to derive a target score. A target score for a stratified portfolio, such as a target alpha score, can be defined relative to a baseline normative target score.

A variety of statistical properties may be studied using empirical or simulated data on a stratified or segmented portfolio, group, or subgroup. As non-limiting examples, a statistical property may be selected from among mean, variance, standard deviation, skew, kurtosis, correlation, semivariance, and semideviation, or the excess or residual of any of these.

Statistical tests can be used to establish that for securities associated with attribute-defined functional groupings of companies, commodities, securities, funds, assets, loans, or liabilities a) they exhibit higher intra-group correlation than inter-group correlation; b) that correlation is more persistent and predictive over time than covariance in groupings created quantitatively; c) those groupings can be segmented or stratified in a portfolio to target or control for particular exposures to volatility, variance, or non-systematic risk; d) the variance, standard deviation, semideviation, and/or semivariance are lower at the portfolio level than at the group level, and lower at the group level than at the security level; e) for a given performance metric, exhibit more normally distributed expected or actual values than an alternative grouping, index, or portfolio; or f) this methodology increases the predictability of outcomes and the extent to which returns on large portfolios consistently achieve those predicted by theory.

In some embodiments, the performance metrics may include performance, volatility, liquidity, variance, expected return, alpha, Jensen's alpha, beta, variance, covariance, semivariance, semideviation, correlation, autocorrelation, Sharpe ratio, Sortino ratio, revenue, expenses, operating expenses, earnings, net earnings, gross earnings, income, gross income, net income, cash flow, cash flow from operations, cash flow from operations, cash flow from investing, or cash flow from financing. As non-limiting examples, the normality may be assessed using the Cramér-von Mises criterion, the Kolmogorov-Smirnov test, the Shapiro-Wilk test, the Anderson-Darling test, the Jarque-Bera test, the Siegel-Tukey test, Kuiper test, a p-value test, a Q-Q plot, a test of skewness, or a test of kurtosis.

As non-limiting examples, this statistical methodology enables the construction of large and mid-cap equity portfolios that achieve a consistent risk premium to debt over extended periods of time, as predicted by the Capital Asset Pricing Model, and permits the development of indices that realize rates of risk and liquidity-adjusted return that more predictably attain the market performance posited by financial theory than indices such as the S&P 500™ which are frequently used as proxies for the market.

At an initial step, one or more theoretical or estimated scores can be defined. Using adjustments based on changes made to at least one of the following: 1) changes to the population of investment securities; 2) the stratification or segmentation methodology applied to the population of investment securities; and 3) the weighting applied to the stratified units or segments, the portfolio can be engineered to: 1) create a representative outcome for a given population (referred to herein as a normative case); 2) engineer an outcome that is statistically biased in a user-specified direction.

Depending on the adjustment methodology, the bias can be towards a population subset such as a geographic or temporal group or a particular functional attribute class (or subset of an attribute class) within a specific population set of securities. Within a stratified or segmented architecture for a given population, a specific exposure (or lack thereof) can be managed through the structure itself (either through structure or attribute selection) or the weighting assigned to specific units, groups, attributes, clusters, or segments.

Non-normative composites are composites that are designed to vary from the normative case. Divergence from the normative case may be considered to be an engineered or algorithmic portfolio performance metric, e.g. alpha. Using the invention, negative variance can be engineered as alpha for short investment positions. Engineering positive variance can be engineered as alpha for long investment positions. For example, distributions can be normal (based on the normative case) or non-normal. Non-normative distributions can be positively skewed (to the right of normal), negatively skewed (to the left of normal), platykurtic (fat-tailed), or leptokurtic (thin-tailed). Adjustments to the weightings, as described above, can be used to generate portfolios having these types of distributions.

In some embodiments, groupings can be used to establish pairwise correlation coefficients to be used in Markowitz mean-variance optimization. Instead of using a single correlation value for all pairs of companies, the method can be used to assign correlations to any segment created through this methodology, by, as a non-limiting example, taking the average observed pairwise residual correlation of all segments in a stratum, as well as a measure of out-of-group correlations.

As a non-limiting example, estimating a correlation value for each segment in the third stratum of a stratified heterogeneous 900 security portfolio or index and assigning the relevant value to each constituent of a group can reduce the number of correlations necessary to estimate pairwise correlations by a factor of over 200, facilitating the construction of an index or portfolio that will more consistently and predictably approximate the efficient frontier than other methods of portfolio or index construction.

Data Set Normalization and Probability Shaping

Mathematical processing according to the methods described herein can be applied to large sets of economic and financial data to reduce these fluctuations and randomness of the results, including, as a non-limiting example, those of investment returns. In some embodiments, they include multivariate algorithms can be used to organize large datasets. The methods can be used to generate or identify causal connections and perform real-time analyses.

The system can be configured for normalizing the data sets representing securities. The normalization process includes statistical categorization based on attributes of the entity associated with the security. The attributes used for normalization can be those types of attributes described above, or other attributes relating, as non-limiting examples, to the operations, assets, suppliers, customers, customers of customers, departments, or employees of the entity associated with the security.

Multiple investment securities can be organized into statistical categories. A user interface for selecting among the attributes can be provided by the system, which can include a statistical categories editor (referred to as a thesaurus editor in some embodiments). The statistical categories can be defined within the system using the editor. A statistical category can be defined to be any one or more of the attributes described above, taken alone or in combination with one other. The statistical categories also can be defined based on the syntax and coding systems described above. In some cases, a statistical category can also be a stratified or segmented unit.

Portfolio Powering

Matching or stratification also improves statistical power, particularly if matching, segmentation, or stratification is based on important prognostic variables. Such procedures, accompanied by pre-specified stratified or segmented analyses and sensitivity analyses may, therefore, be useful.

A prospective analysis can be used to determine a sample size required to achieve target statistical power. In general, the most important component affecting statistical power is sample size in the sense that the most frequently asked question in practice is how many observations need to be collected. As a non-limiting example, in assessing portfolio performance, the null hypothesis could be that a stratified grouping has a Sharpe ratio of 1. The alternative hypothesis could be that a stratified grouping has Sharpe ratio other than 1.

Power refers to the probability that a test will find a statistically significant difference when such a difference actually exists. Power is the probability of correctly rejecting the null hypothesis. In some embodiments, power should be 0.8 or greater such that there is an 80% or greater chance of finding a statistically significant difference when there is one.

Bankruptcy Example

The following example illustrates a use case for a composite of investment securities. In this example, a stratified or segmented composite portfolio of investment grade corporate debt securities is created.

Investment-grade debt is a specific class of securities with a well-defined expected rate of return and a well-defined risk. Each bond is rated by a third-party rating agency. This rating captures the estimated likelihood that the bond issuer will default on the debt. In the case of default risk, one of the most pertinent risks in investing in such securities, corporate bonds with the same rating should have similar yields to maturity, holding other variables, such as maturity, constant. The yield to maturity is the compounded annual rate of return that the bondholder will earn in holding the bond to maturity given its current price, assuming all payments (coupon payments and face value) are made as expected. Put another way, the yield to maturity is the discount rate that makes the present value of the bond's future cash flows, assuming all payments are made, equal to the current price of the bond. For all bonds that have a comparable rating from these agencies, the forecasted yields for a given maturity date will be the same or within a very tight range. That is, investment-grade corporate debt securities behave predictably.

While different investment-grade debt securities may have the same estimated probability of default, the event or events that trigger a default vary from issuer to issuer. That is, companies may face different risk factors relative to the specific attribute set associated with the company and its operations. Some of these factors may be unique to that company, while others may be common to groups of companies. Such risks may include, as non-limiting examples, industry risk, product risk, customer risk, sensitivity to interest rates, geographic, political, or economic factors outside a company's control, or risks related to the company's CEO or management in general. There are many company-specific attributes that can be tied to a company's default risk. These can include, but are not limited to:

1) Functional operating or asset-based attributes: Such attributes are not accounting or performance measures and indicators, but rather, as non-limiting examples, attributes that define what a company does, such as manufacturing or transportation; attributes or tags related to the company's product, such as car, computer, or couch as well as type of car, computer or couch; attributes related to a company's customer such as consumer or business; attributes related to the customer's customer; attributes related to the geographic location of a business or its individual operations; attributes related to the products and materials a company uses to provide its product; attributes related to any of the multivariate industries or industry segments in which a company may operate; attributes related to the structure of a company's business such as integrated, non-integrated, forward integrated, backward integrated, or networked; attributes related to any of the multivariate governmental or macro-economic risks associated with a specific business or country where a company does business; attributes associated with the accounting or business risks listed by a company as core to their business; risks associated with categorization tied to a specific business or segment by the investment community. At any given point in time, any one of these factors or industry events related to these factors may cause or increase the risk of bankruptcy in any specific company.

2) Management or strategy: A company has unique risks based on its management team, its decisions, and its strategies.

3) Company asset value: Bankruptcy (being one type of default) fundamentally changes the terms of the securities issued by a single company. Upon filing, the presumption of returns based on ongoing operations changes to include a liquidation scenario and the analysis of the rights of each security holder. In this case, investors assess their ability to receive payment on a given security based on its location in the corporate capital structure. Securities may have been assigned a priority in liquidation. If an underlying asset of a company is sold or disposed of, these liquidation priorities designate seniority.

4) Financial leverage: Some companies are more or less levered than other companies.

Each attribute is a potential source of default or bankruptcy risk for a fixed-income investor. Some of these attributes may relate to groups of companies (e.g. companies that produce cars, or companies whose operations are located in New Orleans). Because of this, a portfolio that does not control for specific attributes can be inadvertently exposed to a concentration in a specific risk. When a member of a group defaults or files for bankruptcy, other companies in that group may also be impacted.

The invention includes methods for building a stratified or segmented composite portfolio of investment-grade corporate debt in such a way that limits exposure to bankruptcy risks, corporate events, and other such non-systematic risk factors by managing the portfolio's exposure to any particular company or industry. In capitalization-weighted debt portfolios, securities are weighted in proportion to their issuance size relative to the total size of all issues in the portfolio. With such an unmanaged weighting scheme, it is possible for companies or industries that issue large amounts of debt to become over-weighted in the portfolio. If one of these companies or industries has a negative event, such as bankruptcy, then the portfolio itself will be dramatically impacted. A stratified or segmented composite portfolio is a tool to cap financial exposure to attribute-related risks.

The application of the invention to manage default risk in an investment-grade corporate debt portfolio provides an illustration of one embodiment. Each debt security has a level of risk that is directly tied to the value in liquidation of the underlying assets of the company. This risk is distinctly separate from financial market risks associated with the supply and demand of the debt security itself, as well as from financial market factors that may impact the rate of return needed for a given investment security at a given point in time, such as the risk free rate at that point in time.

The systems described herein protect against such non-systematic risks across the portfolio; that is, they can reduce or eliminate material impacts of a single security or group of securities. This can be achieved by organizing companies in groups (strata or segments) based on non-systematic attributes, e.g. by grouping together companies with similar products, or similar customer bases. In some cases, stratification or segmentation ensures that no single non-systematic exposure represents a material risk to the portfolio as a whole. In such a composite, bankruptcy exposure is spread across enough unique groups to minimize the impact of bankruptcies in any one group or company.

As a non-limiting example, the invention can be used to create strata or segments as follows. For investment grade bonds, there may be several types of causes of a downgrade or bankruptcy, which may include, as non-limiting examples: 1) company-specific exposure; 2) industry-specific exposure; and 3) product-specific exposure. Investment-grade bonds of a given rating theoretically should have the same probability ex ante of downgrade or bankruptcy risk, but this rating provides no information about the probable causes for bankruptcy. And indeed, for bonds of the same rating, the factors that may cause the issuer to default can be radically different. These bankruptcy factors, however, are directly linked to the functional attributes of the issuing company. Using these attributes, it is possible to group bonds into risk groups based on the properties of their issuers that relate to issuers' bankruptcy factors. This process may be repeated to form a nested architecture of groups, where each sub-group has its own risk but also has risks associated with the parent group. It also may be repeated to form graphs or networks of segmented groups, where each segment and sub-segment share common risks. These risk groups, then, are the strata or segments that may be used to construct a stratified or segmented investment composite, respectively. These processes reduce or mitigate the chance that a negative event in either a single company or industry can severely impact the portfolio.

Industry Risk Example

The following example illustrates an additional use case for stratified or segmented composites of investment securities. In this example, a composite of equities from the S&P 900® index is created. This composite is a broad-based index comprising large- and mid-cap equities issued by US-headquartered companies from a variety of industries. This universe is a combination of the S&P 500® and S&P MidCap 400® indexes, which track large- and mid-cap US companies, respectively. Over periods of time, such a universe of equities should display a consistent return premium relative to a relatively risk-free investment such as US Treasury Bills.

In this example, the returns of the capitalization-weighted S&P 900® are compared with the returns of the same universe of securities engineered into a stratified composite constructed using the method of the invention. Attributes relating to the functional characteristics of these 900 companies are used to create nested strata that group functionally similar companies together. These strata are used to determine weights for each security following the methods described herein. The portfolio is rebalanced quarterly, returning each security to its initial weight.

Stratification and segmentation provide material benefits in environments when specific industries experience large negative price shocks, colloquially referred to as an industry bubble "bursting". As an industry bubble grows, the market capitalization of the companies in the industry grows, thus increasing that industry's weight in the capitalization-weighted portfolio. In capitalization-weighted funds, which lack attribute-based controls on the weights of both individual companies and groups of similar companies, such bubbles can create unintended overexposure to specific risk groups, including those that disproportionately impact a particular industry. When the over-weighted industry bubble collapses, the portfolio suffers disproportionately. Even if the companies outside of the industry bubble perform reasonably, the negative returns of the over-weighted companies can result in negative returns for the entire portfolio.

In stratified composite portfolios, however, the risk of industry bubbles can be substantially mitigated by stratifying the universe such that the strata correspond to distinct industry risks. In this manner, industry-specific risks are isolated and cannot induce disproportionately negative performance in the portfolio.

The growth and collapse of information technology equities from 1997 to 2000 exemplifies the benefits of stratified composite portfolios. Using functional attributes, a group of companies whose business function involves moving, storing, or processing information is defined. Companies in this group include Microsoft, Cisco, Intel, AOL, Qualcomm, and other such information technology companies.

The twenty largest such information technology equities in the S&P 900® grew in weight over the late 1990s such that by the year 2000, they dominated the portfolio. At yearend 1997, 1998, and 1999, these twenty equities collectively weighed 11.8%, 13.7%, and 20.4% of the S&P 900®, respectively. In 2000, when the bubble collapsed, these equities fell in value by 42.3%, while the S&P 900® as a whole returned −6.9%. Excluding these information companies, the rest of the S&P 900® returned 6.8%. That is, the "market-wide" downturn in 2000 was not a systematic failure; it was the result of uncontrolled over-exposure to a single industry.

In a stratified composite portfolio, such industry-specific risk can be controlled. In the example stratified composite portfolio, the same twenty information companies were set at a weight of 2.9% and were rebalanced to this weight quarterly. In 2000, this isolated group performed poorly (falling in value by 59.7%), but outside of this group, the example stratified composite portfolio had healthy returns. Excluding these twenty companies, the example stratified composite portfolio returned 21.3%. In total, the example stratified composite portfolio returned 17.6% in the year 2000, outperforming the capitalization-weighted portfolio of the exact same universe by 24.5%.

The performance of the capitalization-weighted S&P 900® against the example stratified composite portfolio of the same universe demonstrates how stratification can prevent non-systematic industry risks from impacting an entire portfolio.

System Architectures

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

Figure 10:
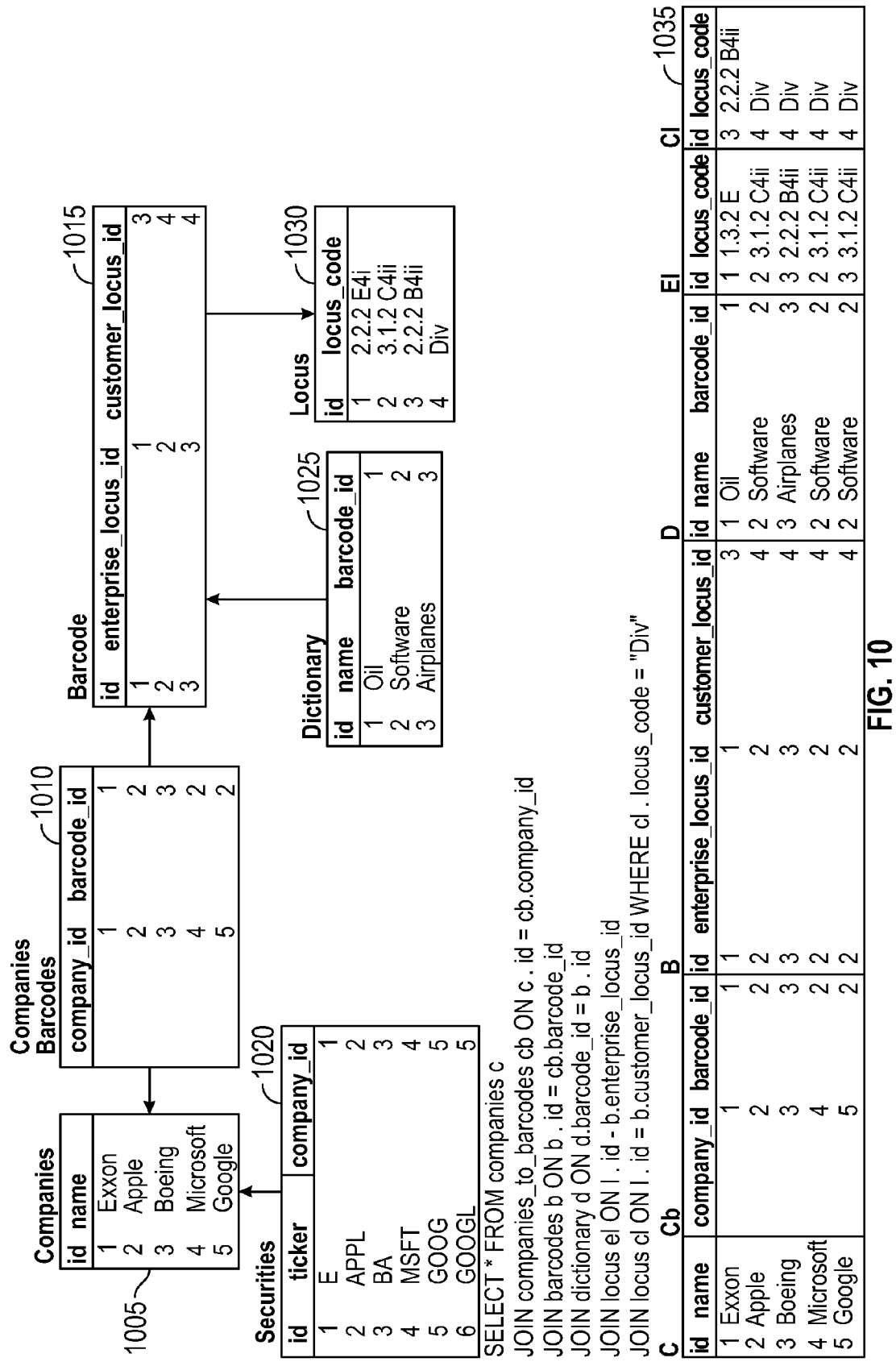
FIG. 10 illustrates an example database implementation for the system.

An example logical implementation of the system is illustrated in FIG. 10. Relationships between tables (1005, 1010, 1015, 1020, 1025, and 1030) are illustrated by arrows. As illustrated, table 1010 serves as a linking table between companies table (1005) and barcode table (1015).

Figure 11:
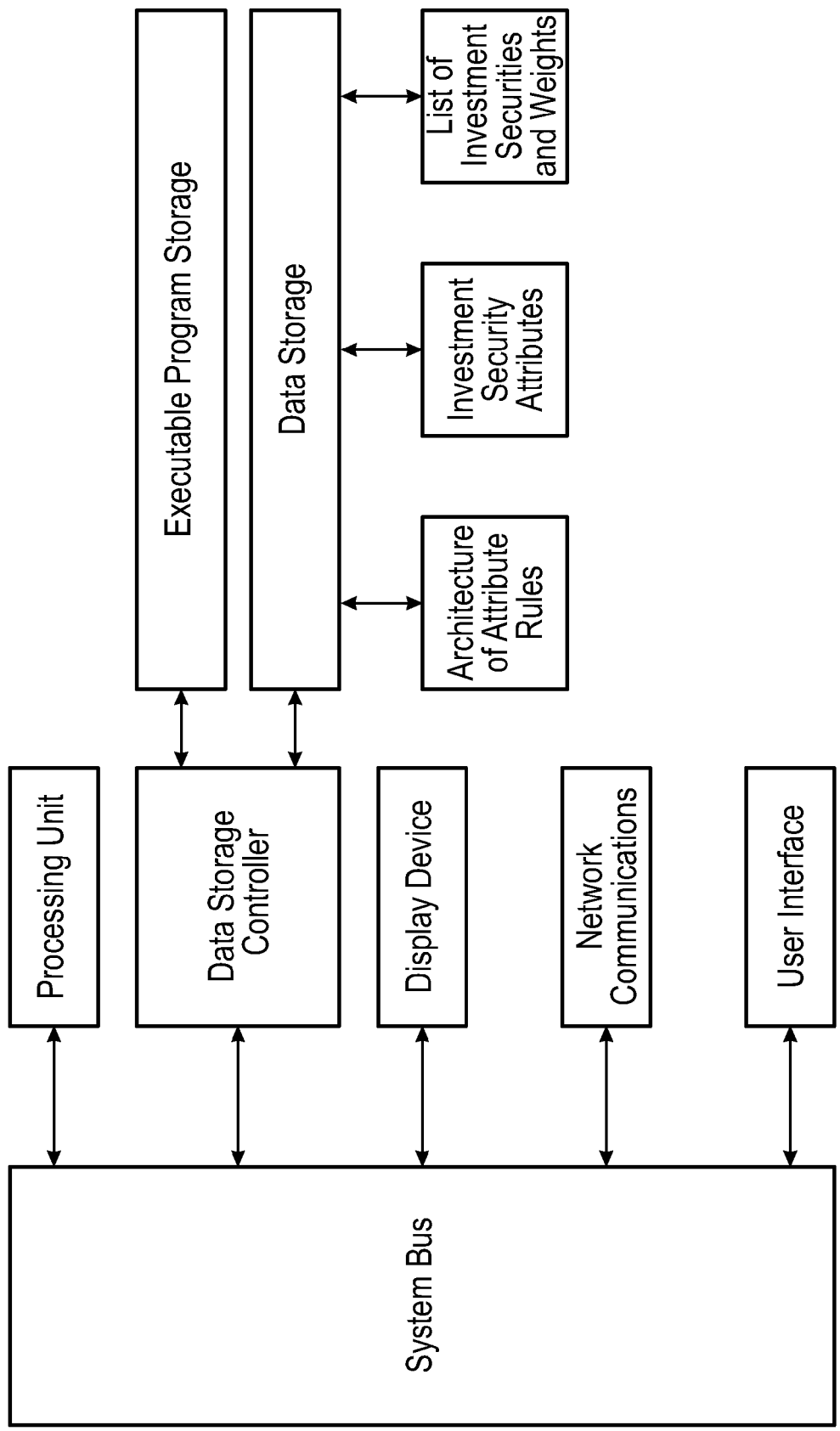
FIG. 11 illustrates an example computerized system for stratified composite portfolio weighting.

An example computerized system for implementing the invention is illustrated in FIG. 11. A processor or computer system can be configured to particularly perform some or all of the method described herein. In some embodiments, the method can be partially or fully automated by one or more computers or processors. The invention may be implemented using a combination of any of hardware, firmware and/or software. The present invention (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the invention may be directed toward one or more computer systems capable of carrying out the functionality described herein. Example computing devices may be, but are not limited to, a personal computer (PC) system running any operating system such as, but not limited to, Microsoft™ Windows™. However, the invention may not be limited to these platforms. Instead, the invention may be implemented on any appropriate computer system running any appropriate operating system. Other components of the invention, such as, but not limited to, a computing device, a communications device, mobile phone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disk drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to computer system.

The computing device may also include an input device such as but not limited to, a mouse or other pointing device such as a digitizer, and a keyboard or other data entry device (not shown). The computing device may also include output devices, such as but not limited to, a display, and a display interface. Computer may include input/output (I/O) devices such as but not limited to a communications interface, cable and communications path, etc. These devices may include, but are not limited to, a network interface card, and modems. Communications interface may allow software and data to be transferred between computer system and external devices.

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include node, which include may hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present invention may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution).

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™ etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

What is claimed is:

1. A method implemented in a computer system for constructing a database characterization of a stratified composite unit of elements of a functional system, the method comprising:

generating and electronically storing a database system comprising a logical data model having a data structure representing an organization of parent nodes and child nodes for aggregating data entities and aggregating attributes of the data entities in a functional information system, the data entities representing elements of the functional system as a network of heterogeneous components, the data entities further corresponding to elements of the functional system ordered by their functional roles in a process converting inputs to outputs;

electronically storing a set of data entities in the database system, the data entities corresponding to elements of the functional system;

electronically assigning the data entity corresponding to an element one or more functional attributes, each of the attributes represented as an electronic tag, wherein the functional attributes characterize the roles of the elements in a process of converting inputs to outputs as represented in the logical data model;

selecting multiple data entities, that correspond to respective multiple elements, for inclusion in a stratified composite unit;

stratifying the multiple data entities that correspond to multiple elements into two or more groups based on the electronic tags representing the functional attributes associated with the corresponding elements, wherein the first group shares a first common functional attribute, and the second group shares a second common functional attribute;

electronically accessing the database representation of the stratified groups;

electronically iterating through the accessed representation to compute weights for one or more of the data entities corresponding to elements based on one or more of the stratified groups; and assigning the weights to one or more of the data entities corresponding to the elements included in the stratified composite unit, wherein the assigned weight is based on the relative location of the data entities in the logical data model and the weights are calculated such that the sum of weights of data entities in child nodes below a parent node equals the weight of the data entity of a parent node;

electronically storing the assigned weightings in association with segmented groups in the database system; and receiving and storing an update to a data entity in the database system that corresponds to a change in the functional system, the update based on a process converting inputs to outputs as represented in the logical data model.

2. The method of claim 1, further comprising:

selecting one of the segmented groups of data entities which share a first common functional attribute;

segmenting the selected group of data entities into two or more sub-groups, wherein the sub-groups are subsets of the segmented groups; and weighting the two or more segmented sub-groups;

electronically storing the weightings in association with segmented groups; and wherein the data entities in a first sub-group share a third common functional attribute and the data entities in a second sub-group share a fourth common functional attribute.

3. The method of claim 2, wherein:

one or more sub-groups are weighted based on functional attributes; and one or more sub-groups are weighted based on non-functional attributes.

4. The method of claim 1, further comprising:

assigning an m-dimensional set of n-dimensional vectors to a set of data entities corresponding to elements of the functional system, wherein the n-dimensional vectors are assigned based on the functional attributes of the elements;

wherein the assignment of n-dimensional vectors re-organizes the groups based on their functional or non-functional attributes with respect to one or more variables within the functional system;

selecting a variable to normalize with respect to the functional system;

selecting a statistical property associated with normality;

using a statistical test to assess the relative normality of a set of segmented groups;

assigning a target weight to an m-dimensional set of n-dimensional vectors associated with data entities representing a segmented group;

wherein the target weight modifies the divergence of the variable across n-dimensional space so as to ameliorate the normality of the segmented group, as determined by the statistical test; and periodically rebalancing the data entity representing the segmented group to achieve the target weight.

5. The method of claim 1, wherein a plurality of data entities is represented in graphical, sequential, clustered, or networked form.

6. The method of claim 1, wherein a plurality of data entities is represented in graphical, sequential, clustered, or networked form.

7. A system for constructing a database characterization of a stratified composite unit of elements of a functional system the system comprising:

a computerized processor configured for:

generating and electronically storing a database system comprising a logical data model having a data structure representing an organization of parent nodes and child nodes for aggregating data entities and aggregating attributes of the data entities in a functional information system, the data entities representing elements of the functional system as a network of heterogeneous components, the data entities further corresponding to elements of the functional system ordered by their functional roles in a process converting inputs to outputs;

electronically storing a set of data entities in the database system, the data entities corresponding to elements of the functional system;

electronically assigning the data entity corresponding to an element one or more functional attributes, each of the attributes represented as an electronic tag, wherein the functional attributes characterize the roles of the elements in a process of converting inputs to outputs as represented in the logical data model;

selecting multiple data entities, that correspond to respective multiple elements, for inclusion in a stratified composite unit;

stratifying the multiple data entities that correspond to multiple elements into two or more groups based on the electronic tags representing the functional attributes associated with the corresponding elements, wherein the first group shares a first common functional attribute, and the second group shares a second common functional attribute;

electronically accessing the database representation of the stratified groups;

electronically iterating through the accessed representation to compute weights for one or more of the data entities corresponding to elements based on one or more of the stratified groups; and assigning the weights to one or more of the data entities corresponding to the elements included in the stratified composite unit, wherein the assigned weight is based on the relative location of the data entities in the logical data model and the weights are calculated such that the sum of weights of data entities in child nodes below a parent node equals the weight of the data entity of a parent node;

electronically storing the assigned weightings in association with segmented groups in the database system; and receiving and storing an update to a data entity in the database system that corresponds to a change in the functional system, the update based on a process converting inputs to outputs as represented in the logical data model.

8. The system of claim 7, wherein the computerized processor is further configured for:

selecting one of the segmented groups of data entities which share a first common functional attribute;

segmenting the selected group of data entities into two or more sub-groups, wherein the sub-groups are subsets of the segmented groups; and weighting the two or more segmented sub-groups;

electronically storing the weightings in association with segmented groups; and wherein the data entities in a first sub-group share a third common functional attribute and the data entities in a second sub-group share a fourth common functional attribute.

9. The system of claim 7, wherein:

one or more sub-groups are weighted based on functional attributes; and one or more sub-groups are weighted based on non-functional attributes.

10. The system of claim 7, wherein the computerized processor is further configured for:
  assigning an m-dimensional set of n-dimensional vectors to a set of data entities corresponding to elements of the functional system, wherein the n-dimensional vectors are assigned based on the functional attributes of the elements;
  wherein the assignment of n-dimensional vectors reorganizes the groups based on their functional or non-functional attributes with respect to one or more variables within the functional system;
  selecting a variable to normalize with respect to the functional system;
  selecting a statistical property associated with normality;
  using a statistical test to assess the relative normality of a set of segmented groups;
  assigning a target weight to an m-dimensional set of n-dimensional vectors associated with data entities representing a segmented group;
  wherein the target weight modifies the divergence of the variable across n-dimensional space so as to ameliorate the normality of the segmented group, as determined by the statistical test; and
  periodically rebalancing the data entity representing the segmented group to achieve the target weight.

11. A non-transitory computer-readable medium having computer-executable instructions adapted to cause the computer system to perform constructing a database characterization of a stratified composite unit of elements of a functional system, the method further comprising:
  generating and electronically storing a database system comprising a logical data model having a data structure representing an organization of parent nodes and child nodes for aggregating data entities and aggregating attributes of the data entities in a functional information system, the data entities representing elements of the functional system as a network of heterogeneous components, the data entities further corresponding to elements of the functional system ordered by their functional roles in a process converting inputs to outputs;
  electronically storing a set of data entities in the database system, the data entities corresponding to elements of the functional system,
  electronically assigning the data entity corresponding to an element one or more functional attributes, each of the attributes represented as an electronic tag,
  wherein the functional attributes characterize the roles of the elements in a process of converting inputs to outputs as represented in the logical data model;
  selecting multiple data entities, that correspond to respective multiple elements, for inclusion in a stratified composite unit;
  stratifying the multiple data entities that correspond to multiple elements into two or more groups based on the electronic tags representing the functional attributes associated with the corresponding elements,
  wherein the first group shares a first common functional attribute, and the second group shares a second common functional attribute;
  electronically accessing the database representation of the stratified groups;
  electronically iterating through the accessed representation to compute weights for one or more of the data entities corresponding to elements based on one or more of the stratified groups; and
  assigning the weights to one or more of the data entities corresponding to the elements included in the stratified composite unit, wherein the assigned weight is based on the relative location of the data entities in the logical data model and the weights are calculated such that the sum of weights of data entities in child nodes below a parent node equals the weight of the data entity of a parent node;
  electronically storing the assigned weightings in association with segmented groups in the database system; and
  receiving and storing an update to a data entity in the database system that corresponds to a change in the functional system, the update based on a process converting inputs to outputs as represented in the logical data model.

12. The computer-readable medium of claim 11, further having computer-executable instructions adapted for:
  selecting one of the segmented groups of data entities which share a first common functional attribute;
  segmenting the selected group of data entities into two or more sub-groups, wherein the sub-groups are subsets of the segmented groups; and
  weighting the two or more segmented sub-groups;
  electronically storing the weightings in association with segmented groups; and
  wherein the data entities in a first sub-group share a third common functional attribute and the data entities in a second sub-group share a fourth common functional attribute.

13. The computer-readable medium of claim 11, wherein:
  one or more sub-groups are weighted based on functional attributes; and
  one or more sub-groups are weighted based on non-functional attributes.

14. The computer-readable medium of claim 11, further having computer-executable instructions adapted for:
  assigning an m-dimensional set of n-dimensional vectors to a set of data entities corresponding to elements of the functional system, wherein the n-dimensional vectors are assigned based on the functional attributes of the elements;
  wherein the assignment of n-dimensional vectors reorganizes the groups based on their functional or non-functional attributes with respect to one or more variables within the functional system;
  selecting a variable to normalize with respect to the functional system;
  selecting a statistical property associated with normality;
  using a statistical test to assess the relative normality of a set of segmented groups;
  assigning a target weight to an m-dimensional set of n-dimensional vectors associated with data entities representing a segmented group;
  wherein the target weight modifies the divergence of the variable across n-dimensional space so as to ameliorate the normality of the segmented group, as determined by the statistical test; and
  periodically rebalancing the data entity representing the segmented group to achieve the target weight.

15. The computer-readable medium of claim 11, wherein a plurality of data entities is represented in graphical, sequential, clustered, or networked form.

* * * * *